US007194420B2

(12) United States Patent
Ikezawa et al.

(10) Patent No.: US 7,194,420 B2
(45) Date of Patent: Mar. 20, 2007

(54) METHOD AND SYSTEM FOR PLANNING SUPPLY OF COMMODITIES

(75) Inventors: Toyoji Ikezawa, Kanagawa (JP); Masao Koide, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1048 days.

(21) Appl. No.: 09/986,908

(22) Filed: Nov. 13, 2001

(65) Prior Publication Data
US 2002/0059096 A1    May 16, 2002

(30) Foreign Application Priority Data
Nov. 13, 2000    (JP)    ............................. 2000-344819

(51) Int. Cl.
*G06Q 10/00*    (2006.01)
(52) U.S. Cl. ...................................................... 705/10
(58) Field of Classification Search .................. 705/10
See application file for complete search history.

(56) References Cited

U.S. PATENT DOCUMENTS

| 6,078,903 | A | * | 6/2000 | Kealhofer | .................. 705/36 R |
| 6,151,582 | A | * | 11/2000 | Huang et al. | .................. 705/8 |
| 6,625,577 | B1 | * | 9/2003 | Jameson | .......................... 705/8 |
| 6,910,017 | B1 | * | 6/2005 | Woo et al. | ....................... 705/10 |
| 2003/0033191 | A1 | * | 2/2003 | Davies et al. | .................. 705/10 |

FOREIGN PATENT DOCUMENTS

JP         11215702 A   *   8/1999

OTHER PUBLICATIONS

Business Wire, "SalesLogix New SolutionPacks Deliver Advanced Sales Forecasting and Enterprise Power; New Technology Facilitates Rapid Development of Custom SalesLogix Plug-Ins", Nov. 3, 1998, New York, p. 1, ProQuest ID 35631983.*
Cohen, Andy; "Predicting the Future", Sep. 1996, Sales and Marketing Management; 148; 9; ABI/INFORM Global, p. 30.*
BusinessWire, "ChannelWave Introduces Release 2.0 of Partner Relationship Management Software; Solution to Help Companies Maximize Return on Channel Sales and marketing Efforts", Jan. 1999, Dialog 04115649.*
Agnew, Marion; "CRM Tools Offer Sales-Force Solutions", Aug. 21, 2000, InformationWeek, 2000, 800, ABI/INFORM Global, p. 116.*

(Continued)

*Primary Examiner*—Michelle Tarae
*Assistant Examiner*—Jonathan G Sterrett
(74) *Attorney, Agent, or Firm*—Oblon, Spivak, McClelland, Maier & Neustadt, P.C.

(57) ABSTRACT

An SFA server stores transaction information representing the contents of each of a plurality of business transactions for providing customers with commodities and including the expected sales of the commodities in each of the transactions in a customer database. The SFA server also stores progress information representing that each of the plurality of the transactions has reached one of a plurality of stages each indicating a progress level of the transaction, in association with the transaction information. An SCM server estimates a future demand for the commodities, based on the transaction information and the progress information associated with the transaction information.

22 Claims, 16 Drawing Sheets

OTHER PUBLICATIONS

Bartholomew, Doug; "Sales Management Systems—Sales Tracking Gets Boost—Salessoft package helps managers keep track of prospective sales", Mar. 1996, InformationWeek, p. 89, ProQuest ID 10669373.*

BusinessWire, "Deutsche Leasing Standardizes on Sieble eBusiness Applications", Apr. 2001, p. 0361, Dialog 08538868.*

Greco, Susan; "The rating game: grade your leads to clear the pipe dreams from your sales pipeline", Jan. 1998, Inc., v20, n1, p. 93(2), Dialog 10160906 20108610.*

"SalesLogix2000 for Marketing tracks all your campaigns", web.archive.org saleslogix.com webpage of Nov. 2001, pp. 1-2.*

Melberg, Pookie; "Do you know how profitable our customer relationships are?", Mar./Apr. 1999, iCB, Banking Information Source, p. 40.*

Radice, Mike; "Sellution™, a new generation of advanced sales automation software, is introduced by MKTG: Marketing Technologies", Jun. 1995, New York, PRNewswire, p. 1, ProQuest ID 6336068.*

PRNewswire, "Epicor's Customer Relationship Management Solution Enables Protocol Systems to Attain Significant Increase in Productivity", Feb. 2000, New York, ProQuest ID 50459019.*

BusinessWire, "Vantive Leads the Industry with Major New Release of Front Office Automation Suite", Dec. 1997, p. 12080008, Dialog 05368525 48164168.*

Grushkin, Barry, "Win-win marketing", Oct. 1999, Intelligent Enterprise, 2, 14, ProQuest Computing, p. 16.*

Mico, Sandra, "Relationship management systems provide an advantage", Apr. 1999, Trusts & Estates, 138, 5, ABI/INFORM Global, p. 17.*

Cole, Stephen, "A Model Engagement", May 1997, CA Magazine, 130, 4, ABI/INFORM Global . p. 29.*

U.S. Appl. No. 09/964,585, filed Sep. 28, 2001.

U.S. Appl. No. 09/986,908, filed Nov. 13, 2001.

* cited by examiner

FIG.15

CUSTOMER SECTION STAFF TRANSACTION ACTIVITY CALENDAR

MONTHLY CALENDAR — 151

SALES STAFF NAME ▼

CALENDAR
DAILY
WEEKLY
MONTHLY — 152
ACTIVITY

AUGUST 2001

| MON | TUE | WED | THURS | FRI | SAT/SUN |
|---|---|---|---|---|---|
| 30 | 31 | 1 | 2 | 3 | 4/5 |
| 6 | 7 | 8 | 9 | 10 | 11/12 |
| 13 | 14 | 15 | 16 | 17 | 18/19 |
| 20<br>9:00 REGULAR MEETING<br>10:00 "A" /LAN–<br>CREATE PROPOSAL<br>15:00 "A" /SERVER-PR<br>FOR NEW PRODUCTS | 21<br>10:00 "B" /LAN-PR FOR<br>NEW PRODUCTS<br>13:00 "C" /SYSTEM–<br>CREATE PROPOSAL | 22<br>10:00 "A" /LAN–<br>PRESENT PROPOSAL | 23 | 24 | 25/26 |
| 27 | 28 | 29 | 30 | 31 | 1/2 |

METHOD AND SYSTEM FOR PLANNING SUPPLY OF COMMODITIES

FIELD OF THE INVENTION

The present invention relates to a method and system for planning the supply of commodities.

DESCRIPTION OF THE RELATED ART

To determine the supply of commodities in an enterprise, the enterprise makes first the long-range plan for supplying the commodities based on the estimated demand in the market. Then, the enterprise determines the number of the commodities to be manufactured based on the long-range plan, thereafter determines the supply of the commodities in accordance with the number of the commodities to be manufactured. In the case where the commodities are purchased from the manufacturers or vendors, the enterprise determines the number of the commodities to be purchased in accordance with the long-range plan based on the estimated demand.

However, the market tends to demand commodities with many kinds and small quantity of manufacturing. In the case where the supply of such commodities is determined in accordance with the above procedure, it is difficult to fit the supply to the variable demand that fluctuates quickly within a short period of time. In such circumstances, the enterprise tends to overestimate the supply of the commodities, in order to deal with the demand fluctuation. In this case, a problem arises in that the commodities are oversupplied, and the commodities, components and materials of the commodities are overstocked. If the enterprise underestimates the supply of the commodities to avoid overstocking of the commodities, etc., it takes much time to provide the commodities to customers. In such a case, the enterprise may encounter complaints from the customers, and in the worst case, miss business transactions with the customers.

Furthermore, because the enterprise makes the plan for supplying the commodities based on the general demand estimation, it is difficult to make the supplying plan reflect the results of sales activities toward the customer.

SUMMARY OF THE INVENTION

The present invention has been made in consideration of the above. It is accordingly an object of the present invention to provide a commodity-supply planning method and system for determining a commodity-supply plan to fit the supply to the demand for commodities which fluctuates rapidly within a short period of time.

Another object thereof is to provide a commodity-supply planning method and system for making the commodity-supply plan appropriately reflect the results of sales activities.

In order to attain the above objects, according to the first aspect of the present invention, there is provided a commodity-supply planning method comprising the steps of:

storing transaction information representing contents of each of a plurality of transactions in a storage, in association with each of the plurality of transactions each for providing commodities to customers, and storing progress information representing whether each of the plurality of transactions is in a state of attaining each of a plurality of stages each indicating a progress level of the transaction based on progress of sales activities performed for accomplishing the transaction, in association with the transaction information, in the storage; and estimating a future demand for the commodities, based on the transaction information and the progress information associated with the transaction information.

The stored transaction information includes information representing expected sales of the commodities in each of the plurality of transactions.

According to this structure, the demand for commodities can appropriately be estimated, based on the progress contents of proceeding transactions and the expected sales of commodities to be sold.

The commodity-supply planning method may further include the steps of:

determining the highest attained stage for each of the plurality of transactions, based on the progress information in association with each of the plurality of transactions, and summing expected sales of the commodities in each of the plurality of transactions with the same highest attained stage, at a plurality of points in time; and estimating a future demand for the commodities, based on the expected sales of the commodities and an actual demand for the commodities.

The commodity-supply planning method may further include the steps of:

calculating a change rate in the expected sales of the commodities based on the expected sales of the commodities, at each of the plurality of the stages, and estimating the future demand for the commodities, based on the actual demand and the calculated change rates at the plurality of the stages.

The commodity-supply planning method may further include the steps of:

calculating an accomplishment probability by each stage of the plurality of the stages, the accomplishment probability being a probability that each of the transactions in a state of attaining the stage as the highest attained stage will be successfully accomplished after a predetermined period of time, based on statistical data representing a period of time required for successfully accomplishing each of the transactions in a state of attaining the stage as the highest attained stage;

multiplying, by each stage, a sum of the expected sales of the commodities by the accomplishment probability; and setting a sum of the products calculated in the multiplying step for the plurality of the stages, as an expected demand for the commodities within the predetermined period of time.

The commodity-supply planning method may further include the step of making a plan for supplying the commodities, based on the expected demand and stock of the commodities.

In order to attain the above objects, according to the second aspect of the present invention, there is provided a commodity-supply planning method comprising the steps of:

reading transaction information stored in a first storage and progress information stored in the storage associated with the transaction information; and estimating a future demand for commodities, based on the read transaction information and the progress information, wherein the transaction information represents contents of each of a plurality of transactions for supplying customers with the commodities, and wherein the progress information represents whether each of the plurality of transactions is in a state of attaining each of a plurality of stages each indicating a progress level of the transaction, based on progress of sales activities performed for accomplishing the transaction.

In order to attain the above objects, according to the third aspect of the present invention, there is provided a commodity-supply planning system comprising:
a first server including
a first processor which manages information regarding supplying of commodities,
a first storage which stores information regarding the supplying of the commodities, and
a timer which provides the first processor with date/time information; and
a second server including
a second processor which manages information regarding sales activities of the commodities, and
a second storage which stores information regarding the sales activities,
wherein the second processor
stores transaction information in the second storage, wherein the transaction information represents contents of each of a plurality of transactions each for providing customers with the commodities, and
stores progress information in the second storage associated with the transaction information, wherein the progress information represents whether each of the plurality of the transactions is in a state of attaining each of a plurality of stages, each stage indicating a progress level of each of the plurality of transactions, based on progress of the sales activities performed for accomplishing each of the transactions, and
wherein the first processor
reads the transaction information and the progress information which are stored in the second storage unit, in association with each other, and
estimates a future demand for the commodities, based on the read transaction information and progress information.

In order to attain the above objects, according to the fourth aspect of the present invention, there is provided a commodity-supply planning system comprising:
a processor which manages information regarding supplying of commodities;
a first storage which stores information regarding the supplying of the commodities; and
a timer which provides the processor with date/time information,
wherein the processor
reads out transaction information and progress information which are stored in a second storage in association with each other, and
estimates a future demand for the commodities, based on the read transaction information and progress information,
wherein the transaction information represents contents of each of the plurality of transactions for providing customers with the commodities, and
wherein the progress information represents whether each of the transactions has reached each of a plurality of stages indicating a progress degree of the transaction, in accordance with progress of sales activities performed for successfully accomplishing each transaction specified in the transaction information.

In order to attain the above objects, according to the fifth aspect of the present invention, there is provided a program for controlling a computer to execute the steps of:
storing transaction information representing contents of each of a plurality of transactions for providing customers with commodities and including sales of the commodities in each of the plurality of transactions, in a storage, and storing progress information representing whether each of the plurality of transactions is in a state of attaining each of a plurality of stages, in the storage in association with the transaction information, each stage indicating a progress level of the transaction based on progress of sales activities performed for accomplishing the transaction; and
estimating a future demand for the commodities, based on the transaction information and the progress information in association with each other.

In order to attain the above objects, according to the sixth aspect of the present invention, there is provided a program for controlling a computer to execute the steps of:
estimating a future demand for commodities, based on transaction information and progress information stored in a first storage in association with other; and
making a plan for supplying the commodities based on the estimated future demand, wherein
the transaction information represents contents of each of the plurality of transactions, and includes information representing expected sales of the commodities in each of the transactions, and wherein
the progress information represents whether each of the plurality of transactions is in a state of attaining each of a plurality of stages each indicating a progress level of the transaction, based on progress of sales activities performed for accomplishing the transaction.

BRIEF DESCRIPTION OF THE DRAWINGS

These objects and other objects and advantages of the present invention will become more apparent upon reading of the following detailed description and the accompanying drawings in which:

FIG. 15 is a diagram showing a calendar page to be displayed on the sales-staff terminal.

DETAILED DESCRIPTION OF THE PREFERRED EMBODIMENT

A commodity-supply planning method and commodity-supply planning system according to an embodiment of this invention will now be explained. In this embodiment, explanations will now be made to an Enterprise Activity Management System, by way of example.

Figure 1:
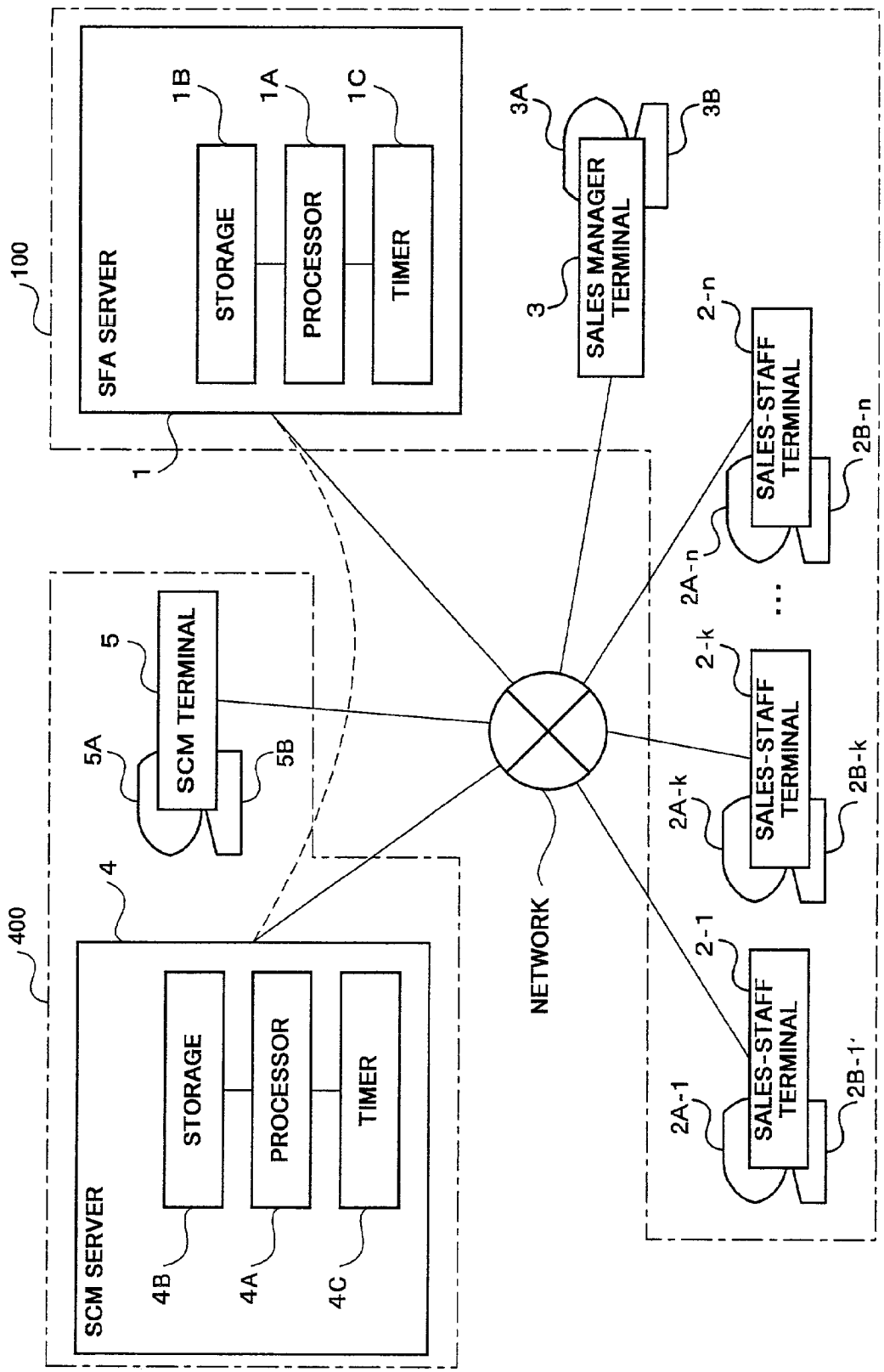
FIG. 1 is a diagram showing the structure of an Enterprise Activity Management System according to an embodiment of this invention.

FIG. 1 is a diagram showing the structure of the Enterprise Activity Management System according to an embodiment of the present invention. As shown in FIG. 1, the Enterprise Activity Management System comprises an SFA (Sales Force Automation) subsystem 100 for supporting/managing sales activities of commodities and an SCM (Supply Chain Management) subsystem 400 for supporting/managing activities for manufacturing/supplying commodities. The SFA subsystem 100 comprises an SFA server 1, a plurality of sales-staff terminals 2-1 to 2-n ("n" represents the total number of sales-staff terminals) and a sales-manager terminal 3. The SCM subsystem 400 comprises an SCM server 4 and an SCM terminal 5. The SFA subsystem 100 and the SCM subsystem 400 work together to support/manage activities of an enterprise in manufacturing, supplying and selling commodities.

The sales-staff terminals 2-1 to 2-n and the sales-manager terminal 3 are connected to the SAF server 1 through an external network (e.g. the Internet, etc.) or an Intra network. The SCM terminal 5 is connected to the SCM server 4 directly or through the external network or the Intra network.

Explanations will now be made to the SFA subsystem 100.

The SFA server 1 comprises a processor 1A, a storage section 1B, and a timer 1C including a crystal oscillator and the like. The storage section 1B and the timer 1C are connected to the processor 1A. The processor 1A includes a CPU (Central Processing Unit) and the like, and executes processing explained later. The timer 1C sequentially generates date/time information representing the present date and time.

Figure 2:
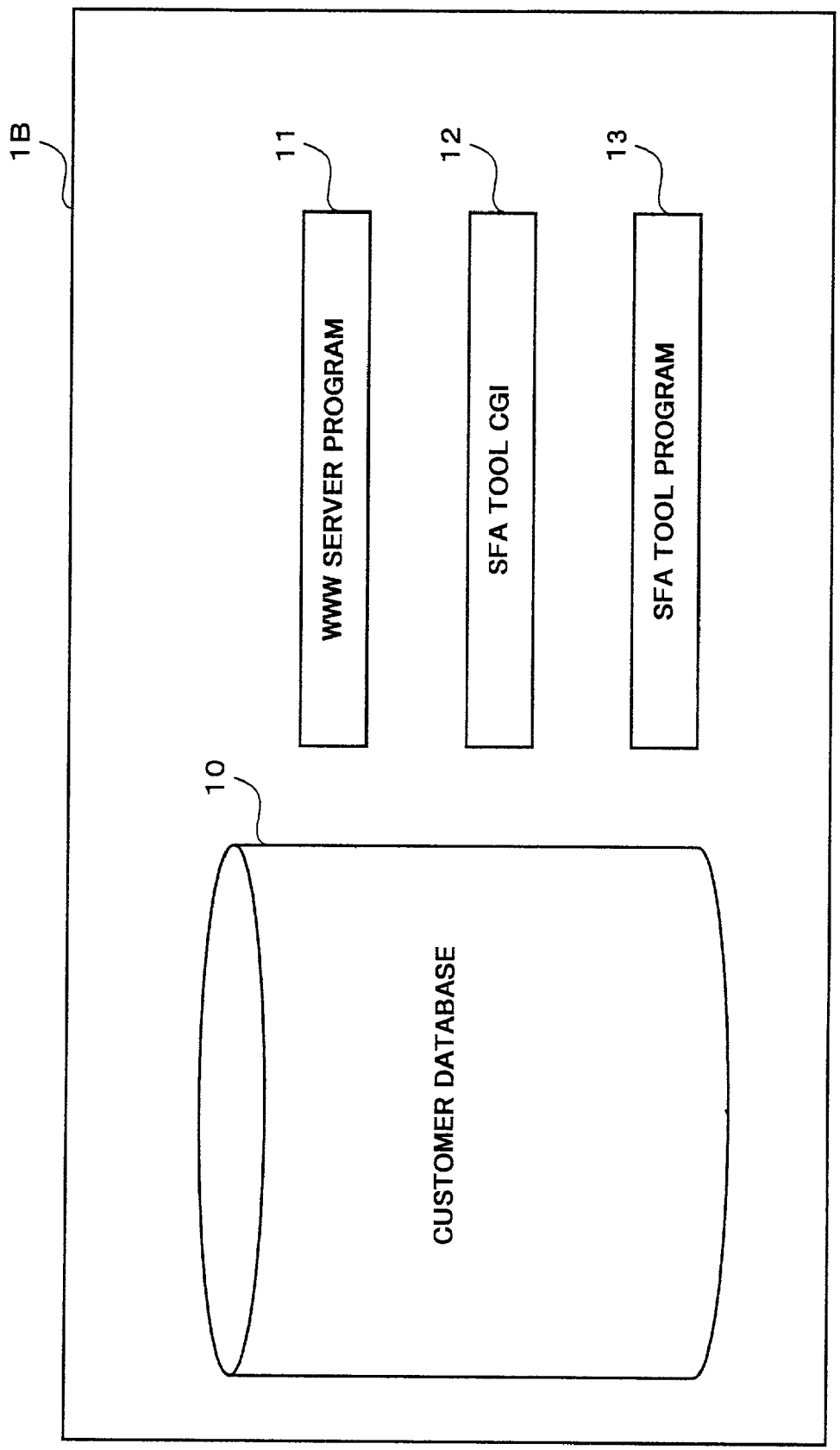
FIG. 2 is a diagram schematically showing the structure of data and programs stored in a storage section of an SFA server shown in FIG. 1.

The storage section 1B includes a hard disk device or a RAM (Random Access Memory), etc. The storage section 1B stores, as illustrated in FIG. 2, a customer database 10, a WWW (World Wide Web) server program 11, an SFA tool CGI (Common Gateway Interface) 12, and an SFA tool program 13.

The customer database 10 stores information regarding target customers of sales activities managed by this SFA subsystem and information regarding the sales activities for the target customer. Such information are updated in accordance with operations as will be explained later.

Figure 3:
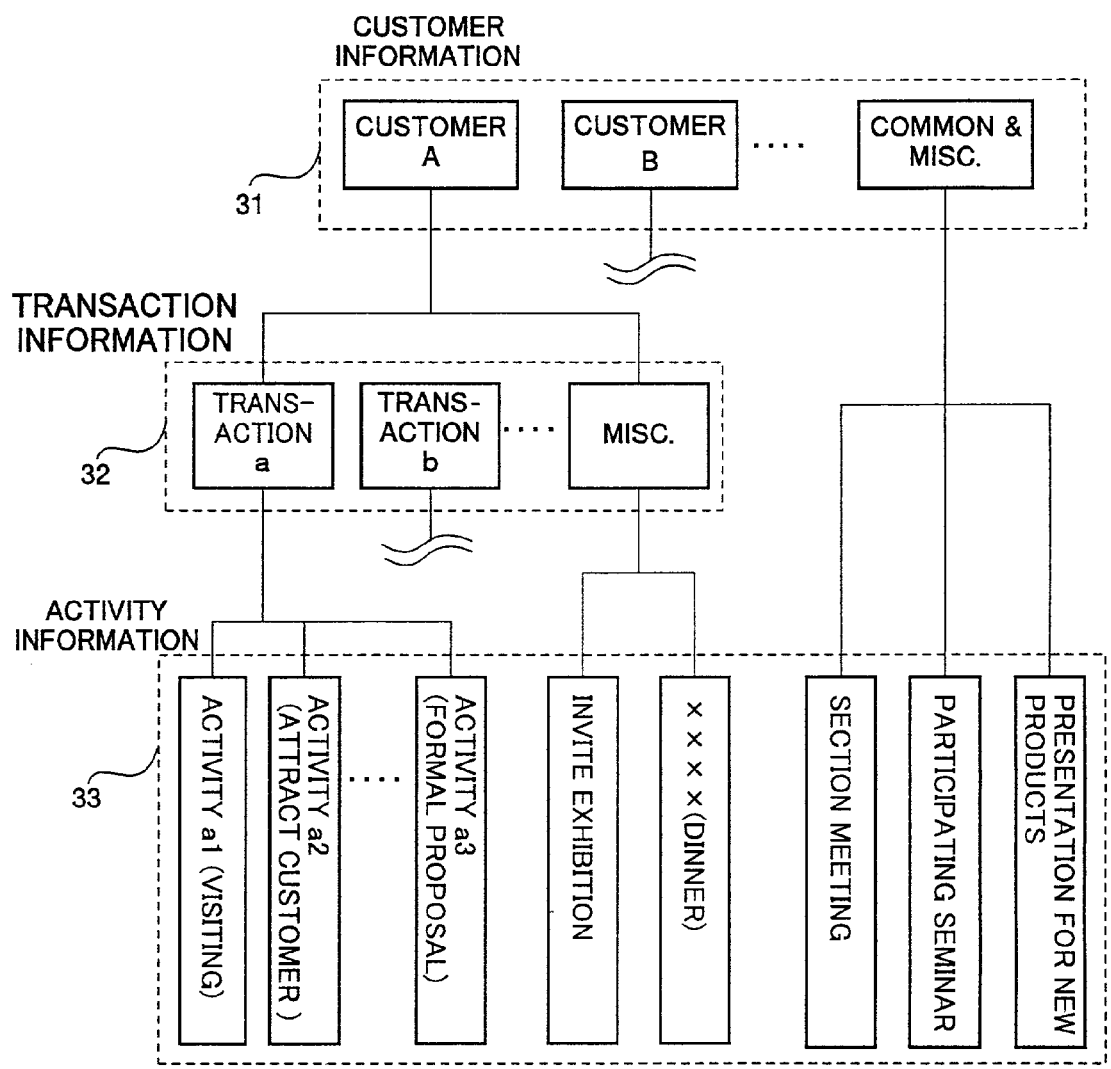
FIG. 3 is a diagram showing the logical data structure of information stored in a customer database shown in FIG. 2.

FIG. 3 is a diagram showing the logical data structure of the information stored in the customer database 10. Specifically, as shown in FIG. 3, stored in the customer database 10 are customer information 31 including information regarding customers, transaction information 32 representing transactions in progress with corresponding customers, and activity information 33 representing activities for each transaction, in association with each other.

In the case where a customer is a section of an organization (an enterprise, corporation, company, etc.,), the customer database 10 stores the following data items of: (A) a name of this customer organization (hereinafter, a customer name); (B) a corresponding section name; (C) a name of a sales staff in charge of a corresponding business transaction in the section; (D) a phone number, facsimile number, or e-mail address of this staff; and (E) the post of this staff, in association with each other.

The customer database 10 stores information representing a transaction in progress with this customer, in a manner corresponding to the customer information. Specifically, in association with the information of the above data items of (A), (B), and (C), the customer database 10 stores transaction information (F) representing the contents of the transaction in progress with the customer. The transaction information includes transaction ID information for identifying each transaction, a transaction title showing a brief outline of a corresponding transaction, a commodity name of a target commodity to be sold to the customer in the transaction, a commodity code assigned to the target commodity, a name of a commodity group to which the target commodity belongs and a commodity group code assigned to the commodity group, and estimated sales of commodities in the transaction with the customer. Note that information for specifically explaining the details of the corresponding transaction may be added in a text format to the above information for identifying the details of the corresponding transaction.

Further, the customer database 10 stores information representing plans and results of the business activities for the transaction concerned, in a manner corresponding to the above customer information and transaction information. Specifically, in association with the above information (F), the customer database 10 stores information (G) representing plans and results (maturity plan) of the business activities performed for the transaction concerned. The maturity plan shown in the information (G) is classified into the following nine stages (1) to (9), in accordance with an intermediate goal (hereinafter referred to as "maturity") which should be accomplished to achieve the transaction.

(1) Stage for Making Connection (actions for getting in contact with new customers, including a visit to the new customers);

(2) Stage for Making Relation (actions for keeping in touch with customers, in order to know the important customers);

(3) Stage for Surveying Customer Situations (actions for researching situations which may have some influence on a contract to be made with the customer, such as an action for researching about competitors or equipment currently-possessed by the customer);

(4) Stage for Providing Something to Attract Customer (actions for providing something to meet the desire of the customer in order to attract the customer);

(5) Stage for Understanding Needs of Customer (actions for researching contents of commodity demanded by the customer);

(6) Stage for Picking Up Matters to be Solved (actions for picking up matters to be solved in order to successfully provide the commodity demanded by the customer);

(7) Stage for Formal Proposal (actions for proposing contract for supplying commodity demanded by the customer);

(8) Stage for Clearing Factors Which May Obstruct Customer to Make Contract (actions for cleaning up any factors which may obstruct the customer to make a contract); and (9) Stage for Entering into Contract.

Each maturity plan is classified into any one of the above nine stages. The higher the stage goes up, i.e. from (1) to (9), the higher the level of the maturity rises as well (i.e. reaching to the success in the deal (transaction)).

The information (G) representing the maturity plan corresponding to one of the nine stages of the maturity includes activity list information, maturity form information, maturity item information, and check flag information. The activity list information (a list of activities) represents specific contents of activities for accomplishing the level of maturity and a planned date for the activities. The maturity form information (maturity form) represents a scheduled date for accomplishing the level of maturity. The maturity item information describes a maturity item that represents an aspect from which it is determined whether the level of maturity is accomplished. The check flag information represents whether the aspect represented in the maturity item of the corresponding transaction is fulfilled. However, each transaction may have a kind of the maturity without any maturity plan.

The customer database 10 stores information (H) representing the credibility of customers, in association with the customers lacking in credibility as judged by the sales staff. The information (H) includes information, representing whether a deal can be made with a corresponding customer and information, suggesting not having a deal with the corresponding customer even if it is possible.

The customer database 10 stores, in association with each transaction, information (I) representing a person or group competing with the manager of this Enterprise Activity Management System in a deal.

The customer database 10 stores information (J) representing a corresponding staff, contents of a plan, and results for the activity without association with any particular customers. The customer database 10 stores, in association with the information (A) of a corresponding customer, information (K) representing a plan and results of activities associated with a particular customer and no particular transactions and information (L) representing a scheduled date for creating a scenario describing ideas for raising the level of maturity in association with a deal to be made with the particular customer. Further, the customer database 10 stores, in association with the information (L) and the information (A), information (M) representing a combination of the scenario and the scheduled date on which the scenario should be created.

The customer database 10 stores a "non-scenario" flag, an "scenario-reviewed" flag, a "scenario delay " flag, a "non-maturity plan" flag, a "non-reviewed maturity plan" flag, a "maturity completion" flag, and a "maturity delay" flag, as will be explained later. The customer database 10 updates a status of each of the flags, i.e. sets or resets each of the flags.

The SFA server 1 carries out retrieval and update of the customer database 10, in response to a request from any one of the sales-staff terminals 2-1 to 2-n, and performs functions as the SFA server for the requested terminal. In this case, the WWW server program 11, the SFA tool CGI 12, and the SFA tool program 13 run on the SFA server 1.

The WWW server program 11 is a program receiving an access request from any one of the sales-staff terminal 2-1 to 2-n or sales-manager terminal 3, and sending a result showing processing done by the SFA server in accordance with the received access request, to the accessing terminal. If any one of the sales-staff terminals 2-1 to 2-n or sales-manager terminal 3 specifies a URL (Uniform Resource Locator) indicating the SFA tool CGI 12 and sends an access request for a Web page to the SFA server 1, the WWW server program 11 receives this access request. Subsequently, the WWW server program 11 starts the SFA TOOL CGI 12, and provides the SFA TOOL CGI 12 with data representing the operational contents of the accessing terminal. Then, the WWW server program 11 sends the result sent from the SFA TOOL CGI 12, to the accessing terminal.

The SFA TOOL CGI 12 is an interface program between the WWW server program 11 and the SFA tool program 13. Upon reception of the data representing the operational contents of the accessing terminal from the WWW server program 11, the SFA TOOL CGI 12 converts the received data in an interface format of the SFA tool program 13, calls the SFA tool program 13, and provides the converted data thereto. The SFA TOOL CGI 12 receives the result of the processing in accordance with the data, from the SFA tool program 13, converts data of the processing result into a Web page description format, such as HTML (Hypertext Markup Language), and provides the WWW server program 11 with the converted data.

The SFA tool program 13 is a program performing functions as the SFA server to be provided to any one of the sales-staff terminals 2-1 to 2-n or sales-manager terminal 3. If the SFA tool program 13 is called from the SFA TOOL CGI 12 and receives the data representing the operational contents of the accessing terminal, it executes various procedures including the operations of the customer database 10 based on the received data so as to perform functions of an SFA tool, and sends results of the various procedures to the SFA TOOL CGI 12.

The above-described operations of the SFA server 1 are common operations of the SFA server 1. Hence, if not necessary in particular, operations of the WWW server program 11, SFA TOOL CGI 12 and SFA tool program 13 will not separately be described. Instead, such operations will be described as the operations of the SFA server 1 as a whole.

Each of the sales-staff terminals 2-1 to 2-n is a terminal that mostly the sales staff operates to perform the business activities. Each of the sales-staff terminals 2-1 to 2-n includes a personal computer, etc. serving as a client terminal of the SFA server 1. The sales-staff terminals 2-1 to 2-n respectively include display devices 2A-1 to 2A-n each having a liquid crystal display etc. and input devices 2B-1 to 2B-n each having a keyboard and/or mouse, etc. The sales staff registers, in the customer database 10, information representing target customers and business transactions and/or information representing plans and results (maturity plan) of the business activities regarding each corresponding business transaction, in accordance with their business activities. Also, the sales staff refers to the registered information, and makes plans for business activities to be processed.

A WWW browser runs on each of the sales-staff terminals 2-1 to 2-n. The operator of each of the sales-staff terminals 2-1 to 2-n operates the WWW browser, and accesses the SFA server 1 in order to request the SFA server 1 for a predetermined function and receive the requested function provided therefrom.

If the operator of a particular sales-staff terminal specifies a URL of the SFA server 1, the WWW browser of the sales-staff terminal accesses the SFA server 1. In the accessed SFA server 1, the WWW server program 11 sends data representing a predetermined Web page to the corresponding sales-staff terminal, for displaying the Web page on the terminal. Further, the operator of the accessing terminal specifies a URL of the CGI by inputting the URL of the SFA TOOL CGI 12 or clicking on a certain point of the Web page which is linked to the SFA TOOL CGI 12. Upon this, the WWW server program 11 starts the SFA TOOL CGI 12. When the SFA server 1 is accessed upon specification of the URL of the SFA server 1 by the sales-staff terminal, the WWW server program 11 may automatically start the SFA TOOL CGI 12.

Operations of the SFA server 1 and sales-staff terminal 2-k will now specifically be explained with reference to FIGS. 4 to 15, in the case where the sales staff operates the sales staff terminal 2-k and where the SFA TOOL CGI 12 is started upon operation of the sales staff terminal 2-k.

Figure 4:
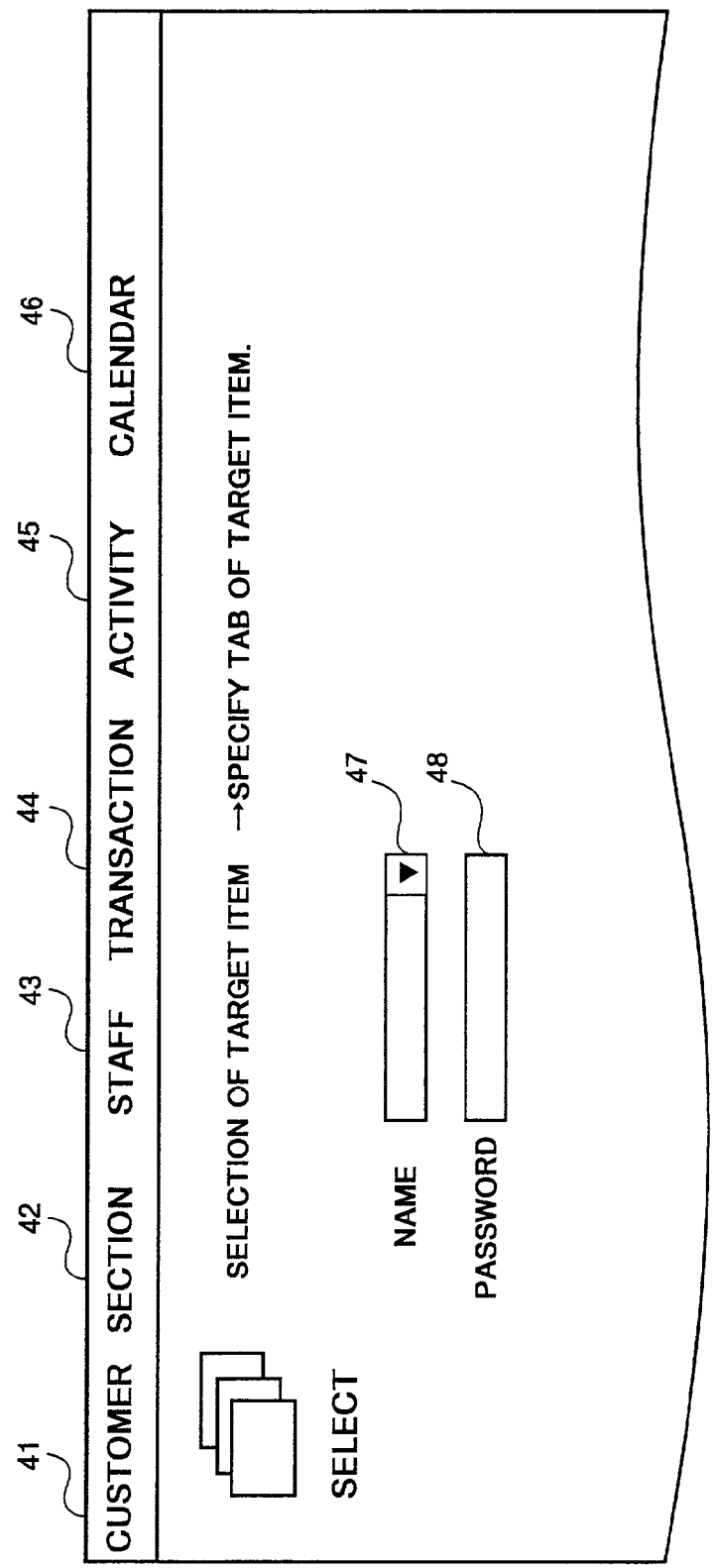
FIG. 4 is a diagram showing a selection page to be displayed on a sales-staff terminal shown in FIG. 1.

FIG. 4 is a diagram showing a schematic image of a selection page. The SFA server 1 sets the sales-staff terminal 2-k to display the selection page for specifying a target item to be operated. That is, in the SFA server 1, the started SFA TOOL CGI 12 provides the WWW server program 11 with data representing a Web page of the selection page. The WWW server program 11 provides the sales-staff terminal 2-k with the received data. The WWW browser of the sales-staff terminal 2-k displays the selection page represented by the data supplied from the SFA server 1, on the display screen of the display device 2A-k the sales-staff terminal 2-k equips.

On various pages shown in the drawings for illustrating the embodiment of the present invention, those that are not directly related to the present invention will not or just briefly be explained in this specification. Of course, each of those pages include GUI (Graphical User Interface) portions provided by a PC which is generally employed in the sales-staff terminals and/or sales manager terminal.

As illustrated in FIG. 4, the selection page includes six tabs 41 to 46 which are set in one-to-one correspondence to items of "Customer", "Section", "Staff " (a corresponding staff to contact with), "Transaction", "Activity", and "Calendar", respectively. The selection page serves as a page for authenticating a user of the SFA server 1, and has boxes 47 and 48 for inputting his/her user name and password. The box 47 for inputting the user name is in a pull-down menu form. If the operator clicks on an triangle symbol on the right part of the box 47, the registered user names are displayed in a pull-down menu form along the box 47.

After the operator of the sales-staff terminal 2-k selects a corresponding name from the pull-down menu displayed along the box 47 and inputs a password in the box 48, the operator may click on one of the six tabs 41 to 46. Upon this, the WWW browser of the sales-staff terminal 2-k sends information representing the specified user name and password and information representing the clicked tab to the SFA server 1. After the SFA server 1 verifies that the received user name and password are registered information, it sends data representing a display page corresponding to the tab shown in the received information to the sales-staff terminal 2-k. The WWW browser of the sales-staff terminal 2-k receives the sent data, and displays the page represented by the received data on the display screen of its display device 2A-k.

When the SFA server 1 receives the information representing the clicked tab, it sets a page to be newly displayed on the sales-staff terminal 2-k, depending on which one of the six items corresponds to the tab shown in the received information. Then, the SFA server 1 sends Web page data representing the set page in an HTML form to the sales-staff terminal 2-k.

Figure 5:
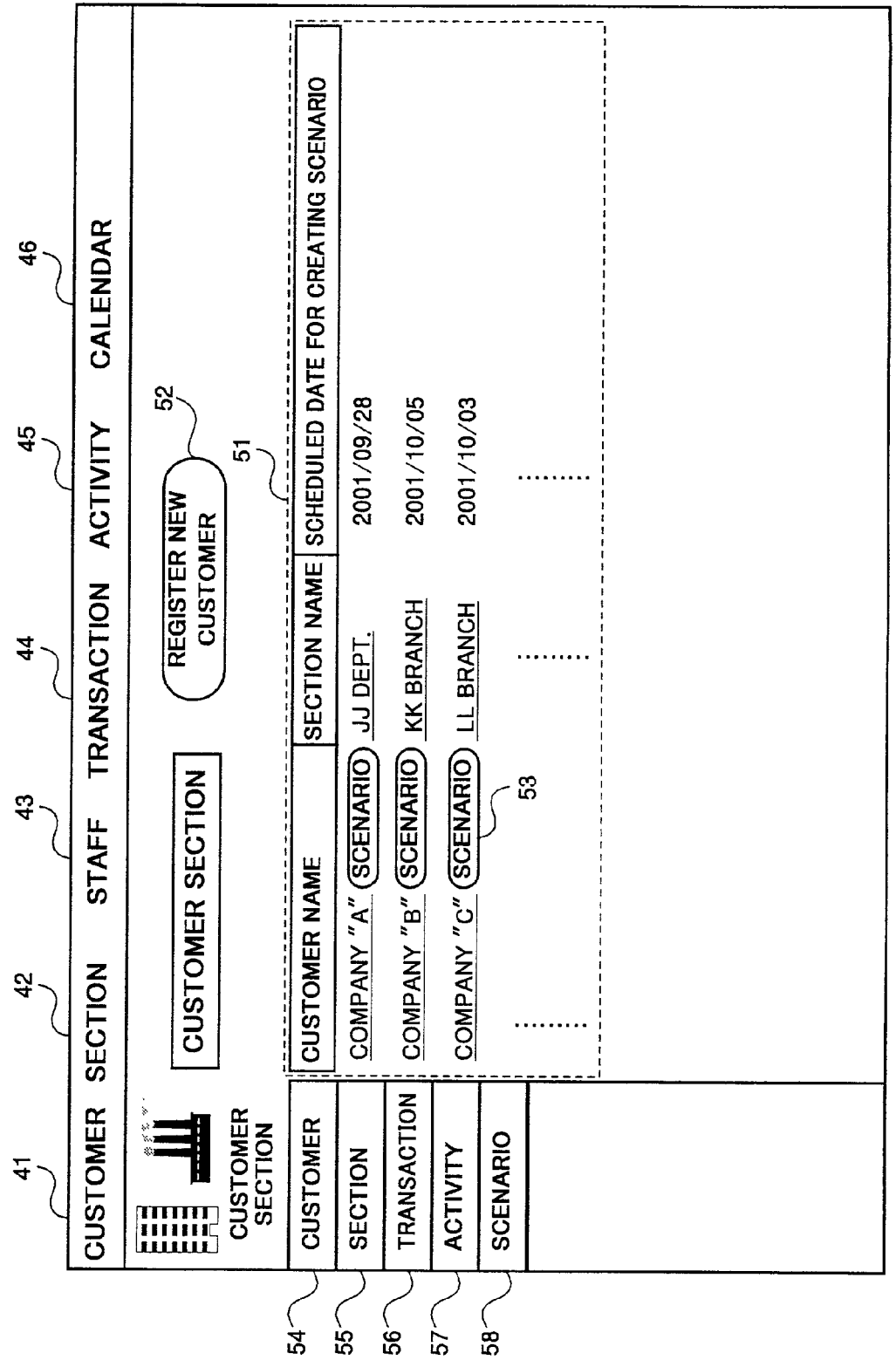
FIG. 5 is a diagram showing a customer-list page to be displayed on the sales-staff terminal.

In the case where the clicked tab corresponds to either one of the items of "Customer", "Section", or "Staff to Contact With", the display page to be displayed on the sales-staff terminal 2-k includes a list of target "Customer", "Section", or "Staff". FIG. 5 is a diagram showing an example of a customer list page that is shown in the case where the tab 42 corresponding to the item of "Section" is clicked on. As shown in FIG. 5, the customer list page includes a customer list 51. The customer list may be created in such a manner that the SFA server 1 searches the customer database 10 for the information of (A), (B), or (C), and creates HTML form data representing a page showing customer name(s), section name(s) or staff name(s) shown in the searched information. As shown in FIG. 5, the customer list page includes, on its left side, five views 54 to 58 of "Customer", "Section", "Transaction", "Activity", and "Scenario".

In FIG. 5, each line under the name of each item of "Customer", "Section", or "Staff to contact with" means that the name is set in the form of a hyperlink. Through this hyperlink, the information representing the customer name, section name, or staff name is linked to a list of transactions in association with each other. Hence, if the operator of the sales-staff terminal 2-k clicks on a customer (organization) name, section name, or staff name included in their corresponding list displayed on the page, the SFA server 1 displays a page including a list of business transactions in association with the clicked name on the sales-staff terminal 2-k. That is, the SFA server 1 searches the customer database 10 for the above-described information (F), and reads out information corresponding to the clicked name included in the information (F). Then the SFA server 1 creates HTML data representing a page including the business transactions shown in the read information.

Figure 6:
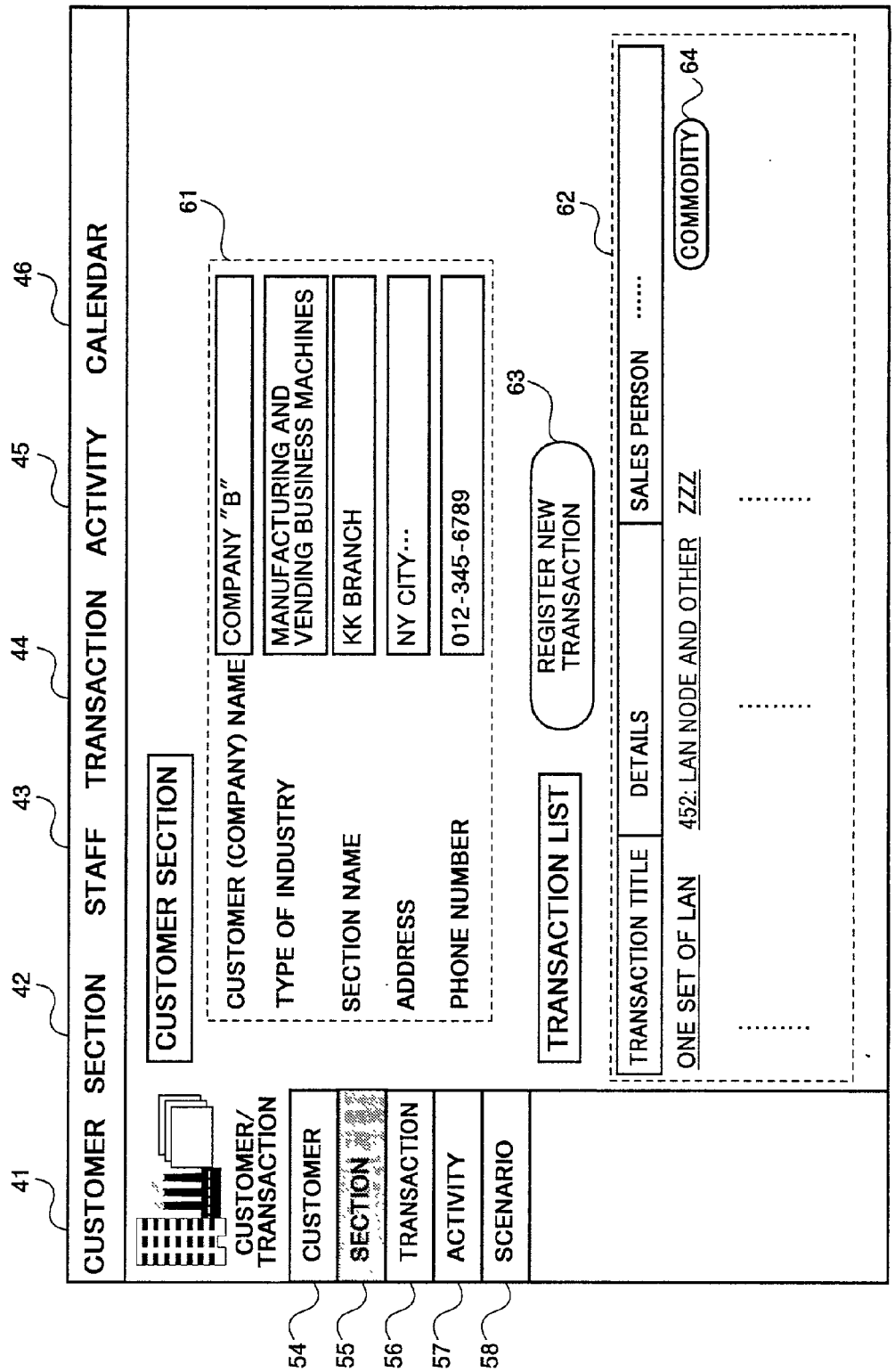
FIG. 6 is a diagram showing a transaction list page (by customer) to be displayed on the sales-staff terminal.

FIG. 6 is a diagram showing a transaction list page (by customer) displayed on the sales-staff terminal 2-k. FIG. 6 shows the case where the operator of the sales-staff terminal 2-k clicks on an item name "KK branch" of the customer (company "B") listed in the second line of the customer list page shown in FIG. 5. As illustrated in FIG. 6, displayed on the transaction list page (by customer) are information 61 regarding the customer and section together with a transaction list 62 of the section.

As shown in FIG. 6, the transaction list page according to customer includes a "New Registration" button 63 for newly registering a transaction and a commodity button 64 for specifying information regarding a commodity to be sold in the transaction, in addition to the five views 54 to 58 of "Customer", "Section", "Transaction", "Activity", and "Scenario". If the operator clicks on the commodity button 64, the SFA server 1 sets the sales-staff terminal 2-k to display a later-described commodity specification page. In the case where the specific number of commodities to be sold is given or where there is a change in the number, models or kinds of commodities to be sold in the transaction along with the progress of sales activities, the operator including the sales staff, etc. specifies the contents of the change in the commodity specification page. In response to this, the SFA server 1 changes corresponding information of the customer database 10 based on the specified information.

On the customer list page shown in FIG. 5, instead of clicking on any of the items of "Customer", "Section", or "Staff to Contact With", the operator may specify the line of the customer in the customer list, and click on the view 56 of "Transaction" on the left hand side of the page, thereby succeeding in shifting to the transaction list page shown in FIG. 6.

As shown in FIG. 5, the page for displaying the list of customers further includes a "Register New Customer" button 52 for newly registering a customer. If the operator of the sales-staff terminal 2-k clicks on this "New Registration" button, the SFA server 1 sets the sales-staff terminal 2-k to display a customer-information registration page for registering information regarding a new customer.

Figure 7:
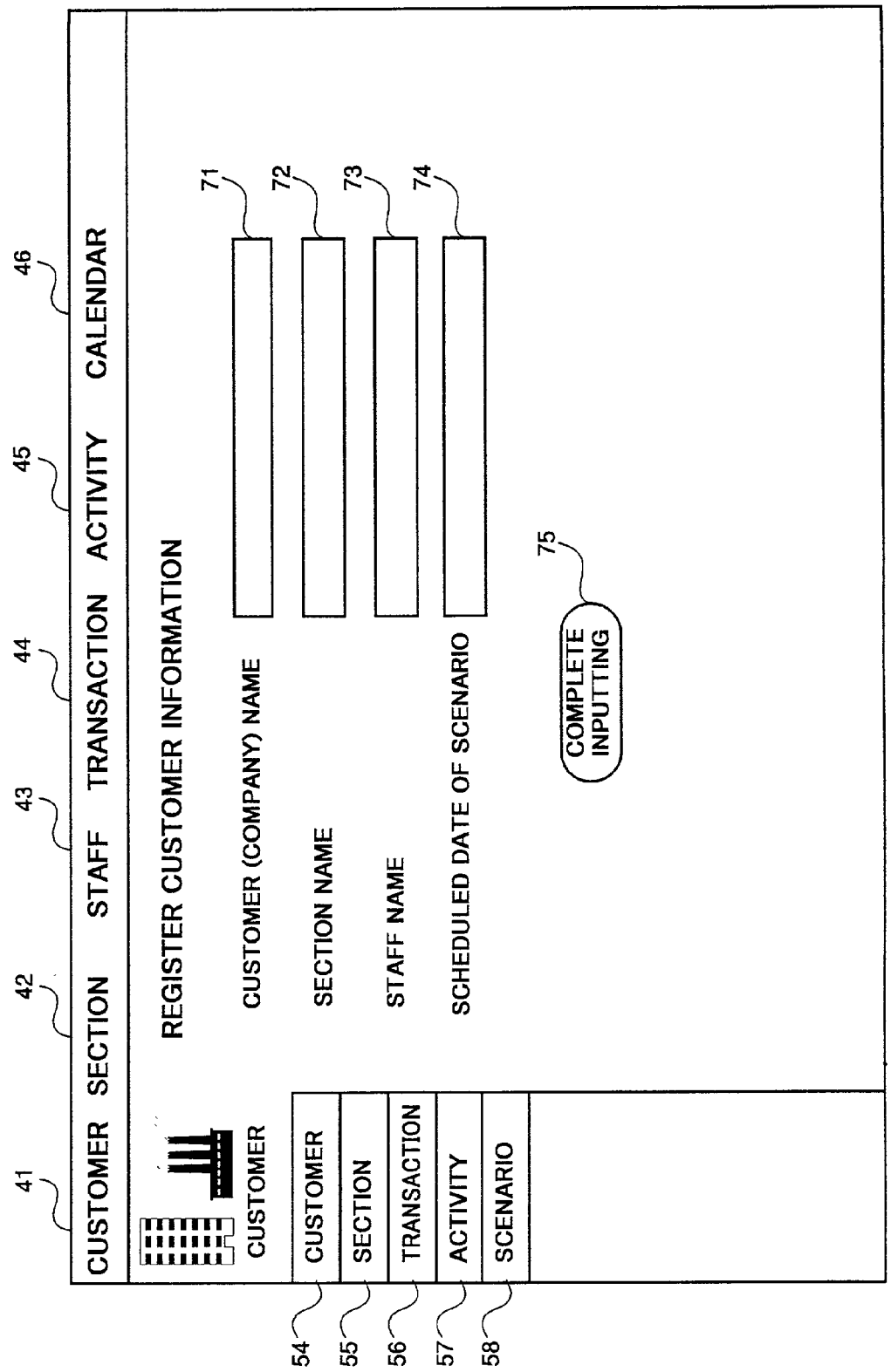
FIG. 7 is a diagram showing a customer-information registration page to be displayed on the sales-staff terminal.

FIG. 7 is a diagram showing the customer-information registration page. As illustrated in FIG. 7, the customer-information registration page includes four text boxes 71 to 74 for inputting respectively "Customer" representing a name of a customer to newly be registered, "Section", "Staff to Contact With", and "Scheduled Date" for creating a strategic scenario for a target customer, in addition to the five views 54 to 58 of "Customer", "Section", "Transaction", "Activity", and "Scenario". The customer-information registration page includes also a "Completion" button 75 for indicating that the inputting is completed.

After the operator inputs required information in each of the text boxes 71 to 74 and clicks on the "Completion" button 75, the sales-staff terminal 2-k sends the input information, i.e. the information representing the customer name, section name, staff name, and scheduled date, to the SFA server 1. Upon this, the SFA server 1 receives the information from the sales-staff terminal 2-k, and registers the information representing the customer name, as the information (A), in the customer database 10. Further, the SFA server 1 registers the information representing the section name, staff name, and scheduled date, as the information (B), (C), and (D) in association with the information (A), in the customer database 10.

In the case where the customer name and scheduled date input in the respective text boxes 71 and 74 have already been registered in the customer database 10, the received information representing the section name and staff name are registered in the customer database 10, as the information (B) and (C) in association with the registered information (A).

The customer information (e.g. industry type information of the corresponding customer, address and phone number of the customer, etc.) other than the information (A), (B) and (C), can be retrieved from a generally-distributed company database other than the customer database 10. When displaying the customer information on the transaction list page shown in FIG. 6, the SFA server 1 may simply retrieve necessary information from the company database using a search key, such as the customer name, etc. When registering a new customer, the SFA server 1 may search the company database for some necessary information, and register the searched information in the customer database. Further, the SFA server 1 may gather information, which can not easily be retrieved from the company database, by requesting the operator of the sales-staff terminal 2-k to input such information from the customer-information registration page or from any other page.

If the SFA server 1 newly registers the information (A) and information (L) in the customer database 10, it sets a "non-scenario" flag indicating that there is no information (M) (scenario) corresponding to the information (A), in the customer information registered in the customer database 10.

A scenario button 53 for registering the strategic scenario is attached to each of the customer names included in the customer list. If the operator of the sales-staff terminal 2-k clicks on the scenario button 53, the SFA server 1 sets the sales-staff terminal 2-k to display a page for registering the strategic scenario.

The page (not illustrated) for newly registering the strategic scenario includes two text boxes for inputting a pathname (e.g. directory name, file name, and the like) of the scenario file to be newly registered, the scheduled date for creating the scenario, and a "Completion" button for indicating that the inputting is completed.

The operator of the sales-staff terminal 2-k creates the strategic scenario by using, for example, a general spread sheet program. The operator of the sales-staff terminal 2-k executes a program for creating the scenario, inputs the contents of the strategic scenario, and creates a file describing the strategic scenario. Subsequently, the operator inputs the pathname and the scheduled date of the created file in a corresponding text box of the above-described page for registering the scenario, and clicks on the "Completion" button. Then, the sales-staff terminal 2-k sends a file of the input pathname and the input scheduled date, to the SFA server 1. Upon reception of the sent file, the SFA server 1 adds the file and the scheduled date in the customer database 10, as the information (M). At this time, the information (M) is stored in the customer database 10, in association with the information (A) representing the customer name having a "new registration" button attached thereto.

If the SFA server 1 newly adds the information (M) in the customer database 10 in association with the information (A) (customer name), it resets a "non-scenario" flag representing that there is no strategic scenario corresponding to the information (A).

The SFA server 1 specifies any customer information in which the strategic scenario has not been created even after the scheduled date specified in the information (L), of the entire customers information registered in the customer database 10, based on the present date and time specified in the date/time information supplied from the timer 1C. The SFA server 1 sets a "scenario delay" flag representing that creation of the strategic scenarios respectively for the specified customers is delayed.

Figure 8:
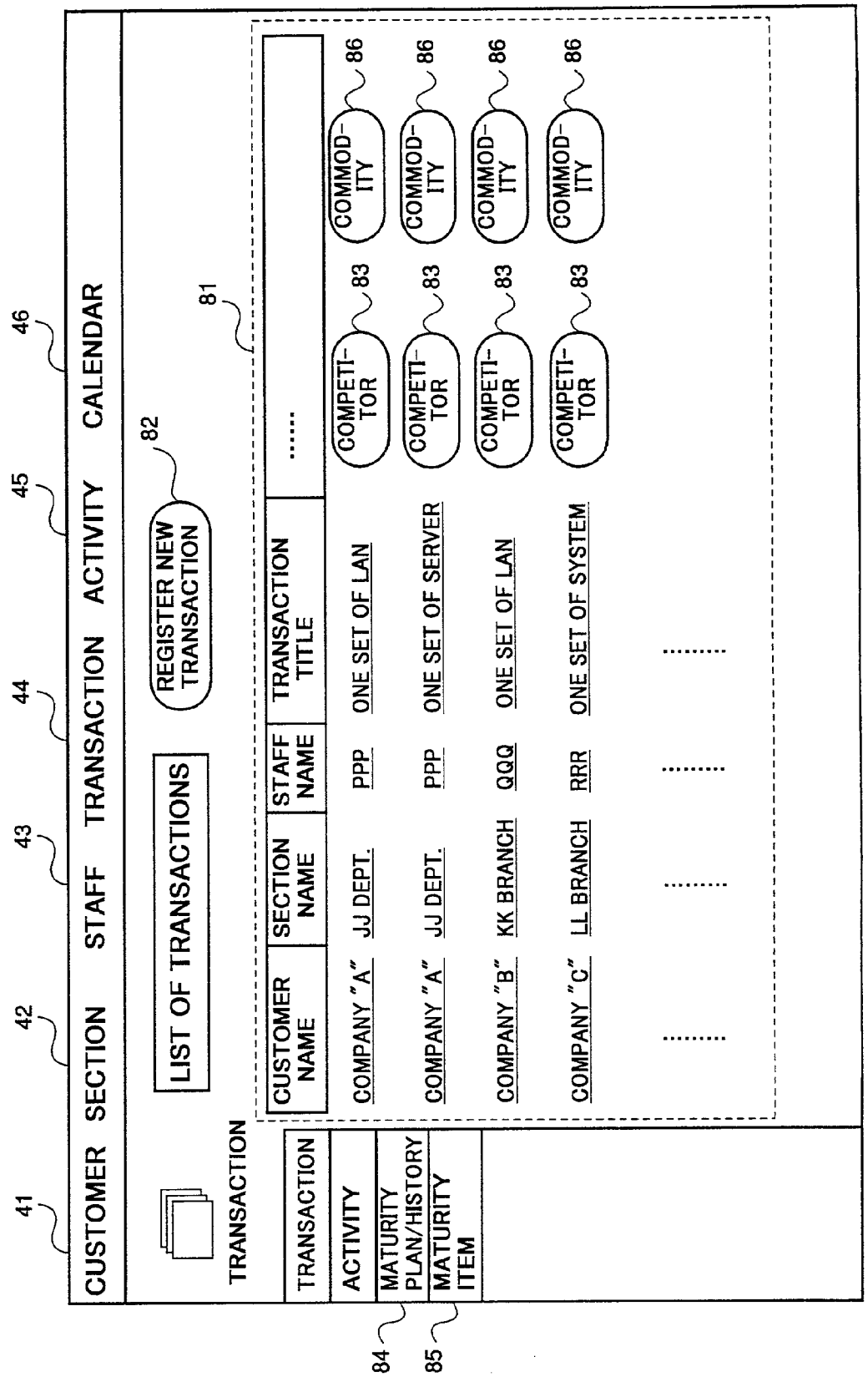
FIG. 8 is a diagram showing a transaction list page to be displayed on the sales-staff terminal.

In the case where the operator clicks on a tab corresponding to the item of "Transaction" in the selection page of FIG. 4, the page that the SFA server 1 sets the sales-staff terminal 2-k to display includes a list of entire business transactions. FIG. 8 is a diagram showing a transaction-list page having this list of entire business transactions. As illustrated in FIG. 8, the transaction-list page includes a transaction list 81, for example. The transaction list can be created in such a way that the SFA server 1 retrieves the information (A), (B), (C), and (F) from the customer database 10 and creates an HTML data representing a page showing transactions represented in the retrieved information.

Further, as shown in FIG. 8, the transaction-list page includes a "New Registration" button 82 for newly registering a business transaction. If the operator clicks on the "New Registration" button on the transaction-list page, the SFA server 1 sets the sales-staff terminal 2-k to display a later-described transaction registration page.

The transaction list in the transaction-list page of FIG. 8 includes a "Competitor" button 83 for newly registering information representing a competitor of each business transaction and a "Commodity" button 86 for specifying information regarding one or more commodities to be sold in this transaction. If the operator of the sales-staff terminal 2-k clicks on this "Competitor" button 83, the SFA server 1 sets the sales-staff terminal 2-k to display a page for inputting the information representing a competitor of each business transaction. If the operator of the sales-staff terminal 2-k clicks on the "Commodity" button, the SFA server 1 sets the sales-staff terminal 2-k to display the commodity specification page, as will more specifically be described later. Along with the progress of the sales activities, in the case where there is a change in the kind, models and number of commodities to be sold in the transaction or where the specific number of the commodities to be sold is given, the operator specifies the change information on the commodity specification page. Upon this, the SFA server 1 updates the customer database 10 based on the specified information.

A page (not illustrate) for inputting the information representing the competitor includes a text box for inputting a competitor name and a "Completion" button for indicating that the inputting of information is completed, and so on.

The operator of the sales-staff terminal 2-k inputs the competitor name in the text box, and clicks on the "Completion" box. Then, the sales-staff terminal 2-k sends the input competitor name to the SFA server 1. Upon reception of the sent competitor name, the SFA server 1 adds the competitor name in the customer database 10, as the information (I). Note that the information (I) is stored in the customer database 10, in association with the information (F) representing the business transaction corresponding to the clicked competitor button attached thereto.

In FIG. 8, a line under each name of the business transaction shown on the transaction-list page means that the name is set in the form of a hyperlink linking the name to the maturity item information of the transaction. If the operator of the sales-staff terminal 2-k clicks on an arbitrary one of the business transactions, the SFA server 1 sets the sales-staff terminal 2-k to display a maturity plan/history page for displaying a list of maturity items corresponding to the clicked transaction.

Figure 9:
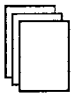
FIG. 9 is a diagram showing a maturity plan/history page to be displayed on the sales-staff terminal.

On the transaction-list page shown in FIG. 8, instead of clicking on the name of the business transaction, the operator may specify the corresponding line of the transaction on the page, and click on the "Maturity Plan/History" view 84 on the left hand side of the page, thereby succeeding in shifting to the maturity plan/history page shown in FIG. 9.

FIG. 9 is a diagram showing a maturity plan/history page. As shown in FIG. 9, the maturity plan/history page includes information 91 regarding a target business transaction and a maturity plan/history 92 of the transaction. The maturity plan/history 92 shows the nine stages of the maturity plan, scheduled dates for completing the respective nine stages, and completion dates on which the respective nine stages are actually achieved. In FIG. 9, each line under the name of each stage means that the information corresponding to underlined stage name is set in the form of a hyperlink linking the underlined stage name to the maturity item information of the maturity stage name. If the operator of the sales-staff terminal 2-k clicks on an arbitrary maturity stage included in the maturity plan/history 92, the SFA server 1 retrieves information regarding the maturity item corresponding to the clicked maturity stage from the customer database 10, and sets the sales-staff terminal 2-k to display a maturity item page for displaying the retrieved information.

Figure 10:
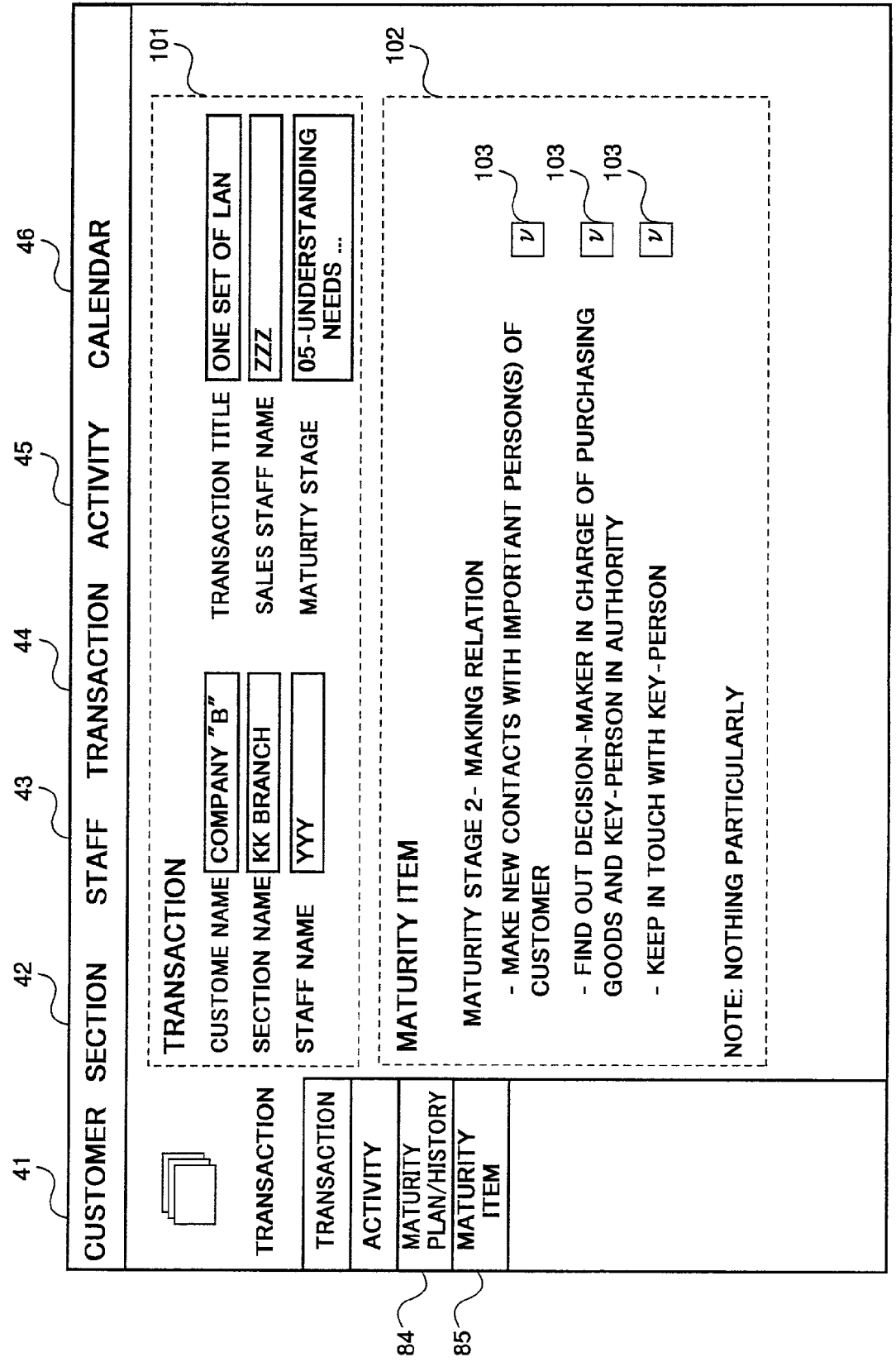
FIG. 10 is a diagram showing a maturity item page to be displayed on the sales-staff terminal.

FIG. 10 is a diagram showing the maturity item page. As shown in FIG. 10, the maturity item page includes information 101 regarding a target business transaction and information 102 regarding a maturity item corresponding to the clicked maturity stage. The information 102 includes a maturity item representing some aspects of criterions for determining whether a corresponding maturity stage is accomplished. Further, the maturity item page includes some check boxes 103 showing whether each corresponding maturity stage is accomplished.

If the operator of the sales-staff terminal 2-k checks on an arbitrary check box, the sales-staff terminal 2-k sends information representing that the corresponding check box has been marked. Upon reception of the information representing that the corresponding check box has been marked, the SFA server 1 stores the completion date and received information in the customer database 10. When displaying the maturity item page on the sales-staff terminal 2-k, the SFA server 1 sets the sales-staff terminal 2-k to show a check mark in the check box of the maturity item corresponding to the information, representing that the aspects of the maturity item are accomplished and stored in the customer database 10.

Based on the present date and time shown in the date/time information generated by the timer 1C, the SFA server 1 examines the accomplishment level of each maturity stage for all the transactions registered in the customer database 10, and stores an examination result in the customer database 10. That is, the SFA server 1 specifies whether there is a maturity stage corresponding to an unchecked check box even the scheduled date has passed. After this, the SFA server 1 sets a "maturity delay" flag representing that the accomplishment of the specified maturity stage is delayed. If there is no maturity stage corresponding to an unchecked check box, i.e. if all check boxes are marked, the SFA server 1 sets a "maturity completion" flag. When displaying the maturity plan/history page shown in FIG. 9 on the sales-staff terminal 2-k, the SFA server 1 sets information representing that the accomplishment of the maturity stage is delayed, in the field of the completion date, if the "maturity delay" flag is set. In addition, the SFA server 1 sets the last date of the completion dates respectively corresponding to the maturity stages, if the "maturity completion" flag is set.

When displaying the maturity item page on the sales-staff terminal 2-k, the SFA server 1 displays also a message for suggesting to check a check box.

In the state where there is a check box that has not yet been checked, of check boxes of a maturity stage to be displayed, the operator may click on a maturity stage at a higher level than the level of the maturity stage of the unchecked check box. In this case, the SFA server 1 sets the sales-staff terminal 2-k to display a "action selection" message for requesting to select one of some treatments in relation to a checked check box and unchecked check box.

Specifically, the contents of the message are to ask the operator to select one treatment of the following actions of:

(A) treating, as a checked box, an unmarked check box of a maturity item corresponding to a maturity at a level lower than a level of the maturity to be displayed on the sales-staff terminal 2-k;

(B) leaving the unmarked check box as is, so as to mark the check box later on, and treating, as a valid data, the input result of the check box of the maturity item corresponding to the maturity to be displayed; and (C) leaving the unmarked check box of the maturity item corresponding to a maturity at a level lower than a level of the maturity to be displayed on the sales-staff terminal 2-k, so as to mark the check box later on, and treating, as an invalid data, the input result of the check box of the maturity item corresponding to the maturity to be displayed.

If the operator of the sales-staff terminal 2-k selects either one of the above treatments of (A), (B), (C), the sales-staff terminal 2-k supplies the SFA server 1 with information representing the operator-selected treatment. Then, the SFA server 1 executes a procedure corresponding to the supplied information.

Though mentioned earlier that the maturity item page shown in FIG. 10 is separated from the maturity plan/history page shown in FIG. 9, the SFA server 1 may display an incorporated page of FIG. 10 in combination with the page of FIG. 9 on the sales-staff terminal 2-k. The incorporated page includes the information 102 showing the maturity item specified by the operator, in addition to the information 91 and maturity plan/history 92.

On the selection page of FIG. 4, in the case where the tab selected by the operator of the sales-staff terminal 2-k corresponds to "Activity", the page which the sales-staff terminal 2-k displays is to show a list of information regarding all activities included in the maturity plans of the entire business transactions. A transaction title, a customer name, and a section name are included to the activity information, in association with each item of the activity information included in the list.

Figure 11:
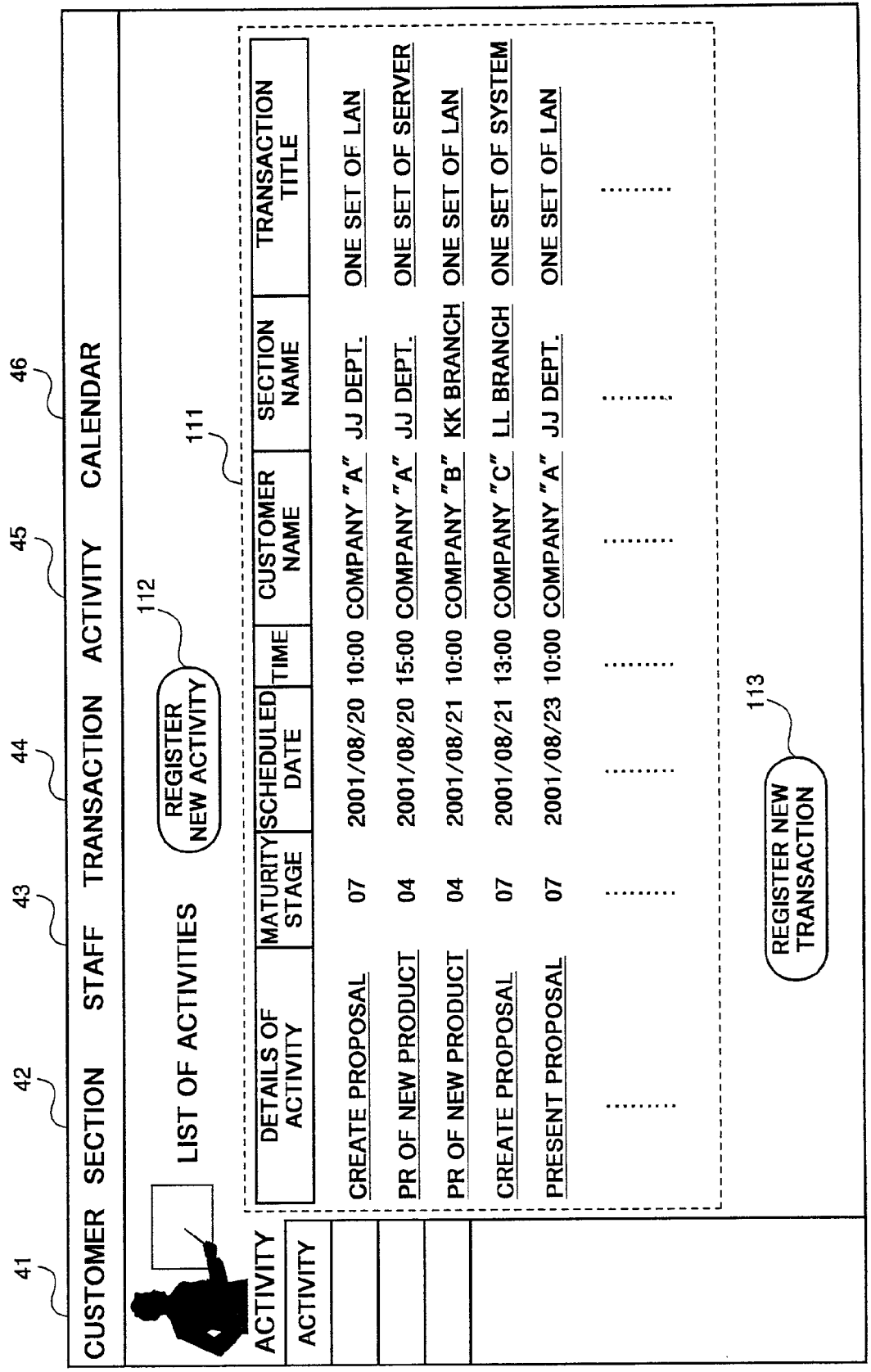
FIG. 11 is a diagram showing an activity-list page to be displayed on the sales-staff terminal.

FIG. 11 is a diagram showing an activity-list page. As shown in FIG. 11, the activity-list page shows a list of activity information sets included in the maturity plans of the entire business transactions, in order of scheduled dates of the activities.

Activity information 111 shown on the activity-list page includes: details of each activity, the maturity that the activity belongs to, scheduled date and time of the activity, customer name, section name of customer's organization, and transaction title, in association with each other. Further, a text box for inputting the date on which the activity shown in the activity list was actually done is included to each activity information set shown in the list.

In the case where a activity is done not for a particular target customer (or for a particular business transaction), the column of the corresponding customer name (or transaction title) is left blank.

The SFA server 1 retrieves the customer database 10 to get the above-described information (A) and (B) and the activity information included in the information (G), so as to acquire the activity information to be shown on the activity-list page. After this, the SFA server 1 specifies which maturity the retrieved activity information is classified into. The SFA server 1 creates HTML data representing a page having the retrieved activity information, transaction title, customer name, section name, maturity, and text box. In addition, the SFA server 1 sends the created data to the sales-staff terminal 2-k to display the data thereon.

A line under each of a customer name and a section name included in each activity information shown on the activity-list page means that the name is set in the form of a hyperlink linking the name to the activity information related to the customer or the section indicated by the name. If the operator of the sales-staff terminal 2-k clicks on an arbitrary one of the customer name and section name, the SFA server 1 sets the sales-staff terminal 2-k to display the activity-list page, showing the activity information including the information (G) in relation to the clicked customer name or section name.

A line under a transaction title included in each activity information shown on the activity-list page means that the transaction title is set in the form of a hyperlink linking the transaction title to the maturity plan/history information related to the transaction title. If the operator of the sales-staff terminal clicks on an arbitrary transaction title, the SFA server 1 retrieves the customer database to get the information (maturity plan) (G) corresponding to the clicked transaction title. Subsequently, the SFA server 1 displays the maturity plan/history page corresponding to the transaction on the sales-staff terminal 2-k.

In the case where the information (maturity plan) (G) in relation to the clicked transaction title is not stored in the customer database 10, the SFA server 1 sets the sales-staff terminal 2-k to display a page for registering the maturity plan of the transaction. The page for inputting the maturity plan includes a plurality of text boxes for inputting the activity information, scheduled completion date, and maturity item, by maturity stages. The page includes also a "Completion" button for indicating that the inputting is completed.

If the operator of the sales-staff terminal 2-k inputs the activity information of each maturity, the scheduled completion date, and the maturity item, and clicks on the "Completion" button, the sales-staff terminal 2-k sends all of the input data to the SFA server 1. Upon reception of the activity information, scheduled completion date, and maturity item, the SFA server 1 stores the received information in the customer database 10, as the information (G). Note that the SFA server 1 stores the information (G) in association with the information, regarding the business transaction corresponding to the transaction title clicked on the activity-list page, and included in the information (F) stored in the customer database 10.

Further, after the SFA server 1 stores the information (G) in association with the information (F) in the customer database 10, it resets a "non-maturity plan" flag indicating that the information (G) corresponding to the information (F) is not registered. The SFA server 1 resets also a "non-reviewed maturity plan" flag indicating that the information (G) has not yet been reviewed (examined) by the sales manager.

The activity-list page includes a "New Activity Registration" button 112 for newly registering a planned activity to be performed or an already-performed activity. If the operator of the sales-staff terminal 2-k clicks on the "New Activity Registration" button 112, the SFA server 1 sets the sales-staff terminal 2-k to display a page for inputting a list of new activities in relation to a particular business transaction.

Figure 12:
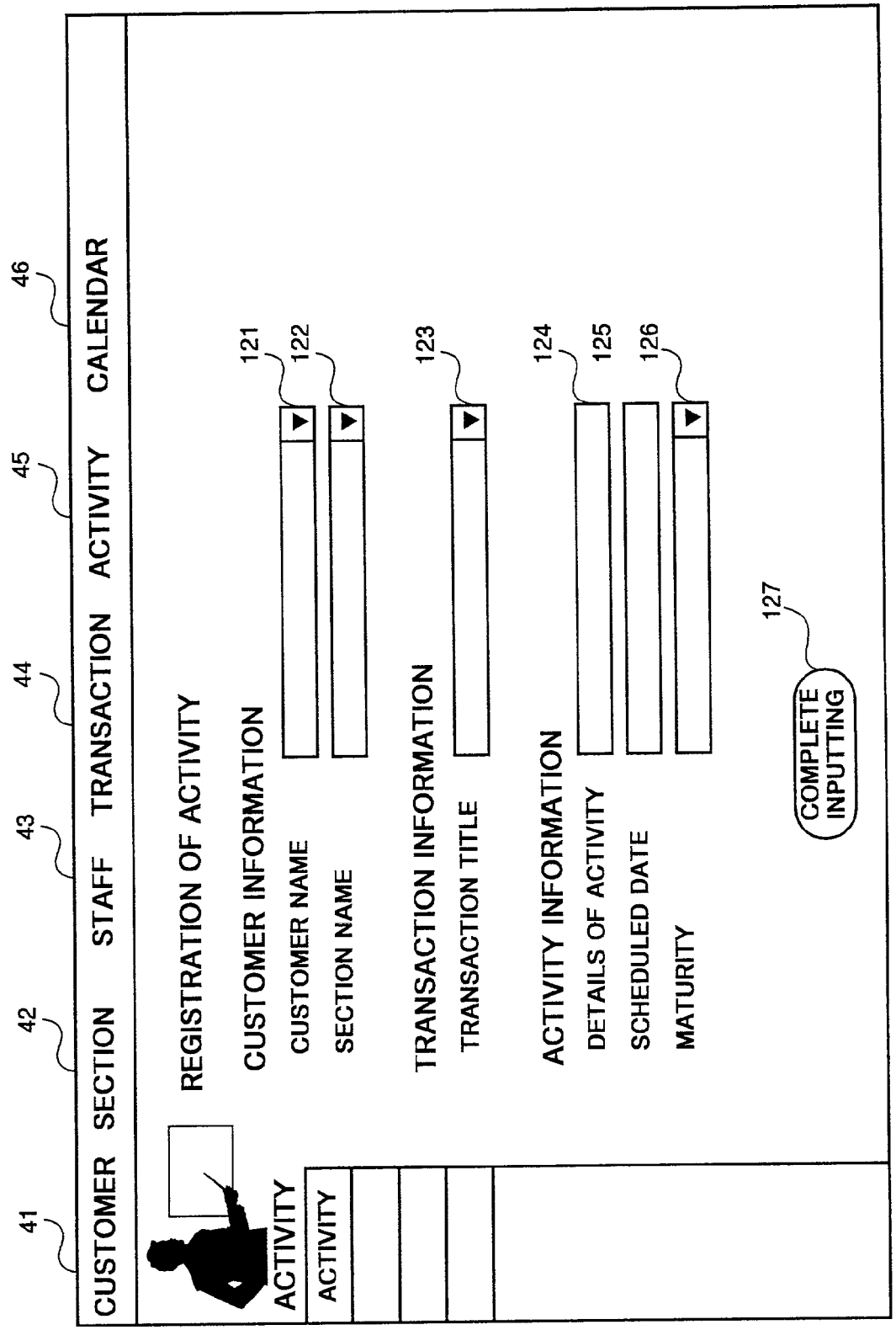
FIG. 12 is a diagram showing a new-activity registration page to be displayed on the sales-staff terminal.

FIG. 12 is a diagram showing a "New Activity Registration" page. As illustrated in FIG. 12, the "New Activity Registration" page includes three pull-down menu boxes 121, 122 and 123, two text boxes 124 and 125, another pull-down menu box 126, and a "Completion" button. The boxes 121, 122 and 123 are prepared for respectively specifying a name of a customer dealt in a transaction corresponding to an activity shown in newly registered activity information, a name of a section of the customer, and a name of the transaction. The two text boxes 124 and 125 are prepared for respectively specifying details of the corresponding activity and a scheduled date of the activity. The box 126 is prepared for inputting the maturity of the activity. The "Completion" button is prepared for indicating that the inputting is completed.

If the operator of the sales-staff terminal 2-k clicks on a triangle symbol on the right hand side of the box 121, a list of customers registered in the customer database 10 appears. Then, the operator selects a corresponding customer name. Similarly, the operator clicks on a triangle symbol of each of the boxes 122 and 123, so as to specify the corresponding section name and transaction title. Further, the operator inputs the details of the activity and the schedule date respectively in the text boxes 124 and 125. Upon clicking on the triangle symbol of the box 126, a list of maturity stages appears. Then, the operator selects a corresponding maturity stage, and clicks on the "Completion" button 127. Upon clicking on the "Completion" button, the sales-staff terminal 2-k sends the specified customer name, section name, transaction title, details of the activity, scheduled date, and maturity stage, to the SFA server 1. Upon reception of the information from the sales-staff terminal 2-k, the SFA server 1 registers the activity information including the details of the activity and the scheduled date, in association with the specified customer name, section name, transaction title, and maturity stage, in the customer database 10.

On the "New Registration Activity" page shown in FIG. 12, the list of customers displayed in response to clicking on the triangle symbol of the box 121 by the operator of the sales-staff terminal 2-k includes an item of "Not For Particular Customer". If the operator specifies this item, the SFA server 1 registers the input activity information in the customer database 10, as information representing an activity for not for particular customers. Similarly, in the case where the operator specifies an item of "Not for Particular Section" and/or "Not for Particular Transaction" included in the lists of the boxes 122 and 123, the SFA server 1 registers the input activity information in the customer database 10, as the activity information not for particular section or activity information not for particular transaction.

In addition to the above, to register the activity information not for particular customer, section, or transaction, a "New Activity Registration" button for registering such activity information may be set on the activity-list page shown in FIG. 11, separately from the "New Activity Registration" button for registering the information regarding the normal activity for a particular customer or particular transaction.

In this case, the activity-list page shown in FIG. 11 includes a "New Activity Registration" button for newly registering an activity not for a particular transaction, together with the "New Activity Registration" information button for registering the information registering the normal activity for a particular customer or particular transaction. If the operator of the sales-staff terminal 2-k clicks on the latter "New Activity Registration" button, the SFA server 1 sets the sales-staff terminal 2-k to display a page for inputting new activity information not for particular customer.

The page for inputting the new activity information not for particular transaction includes two text boxes and a "Completion" box. The two text boxes are for respectively for inputting the detail information of the activity and the scheduled date of the activity. The page also includes a "Completion" button for indicating that the inputting is completed.

If the operator of the sales-staff terminal 2-k inputs the detail information of the activity and the scheduled date of the activity and clicks on the "Completion" button, the sales-staff terminal 2-k sends the input information to the SFA server 1. Upon reception of the information from the sales-staff terminal 21-k, the SFA server 1 registers the received activity information in the customer database 10.

The activity-list page shown in FIG. 11 further includes a "New Transaction Registration" button 113 for newly registering a transaction. If the operator of the sales-staff terminal 2-k clicks on this button 113, the SFA server 1 sets the sales-staff terminal 2-k to display a transaction-registration page.

Figure 13:
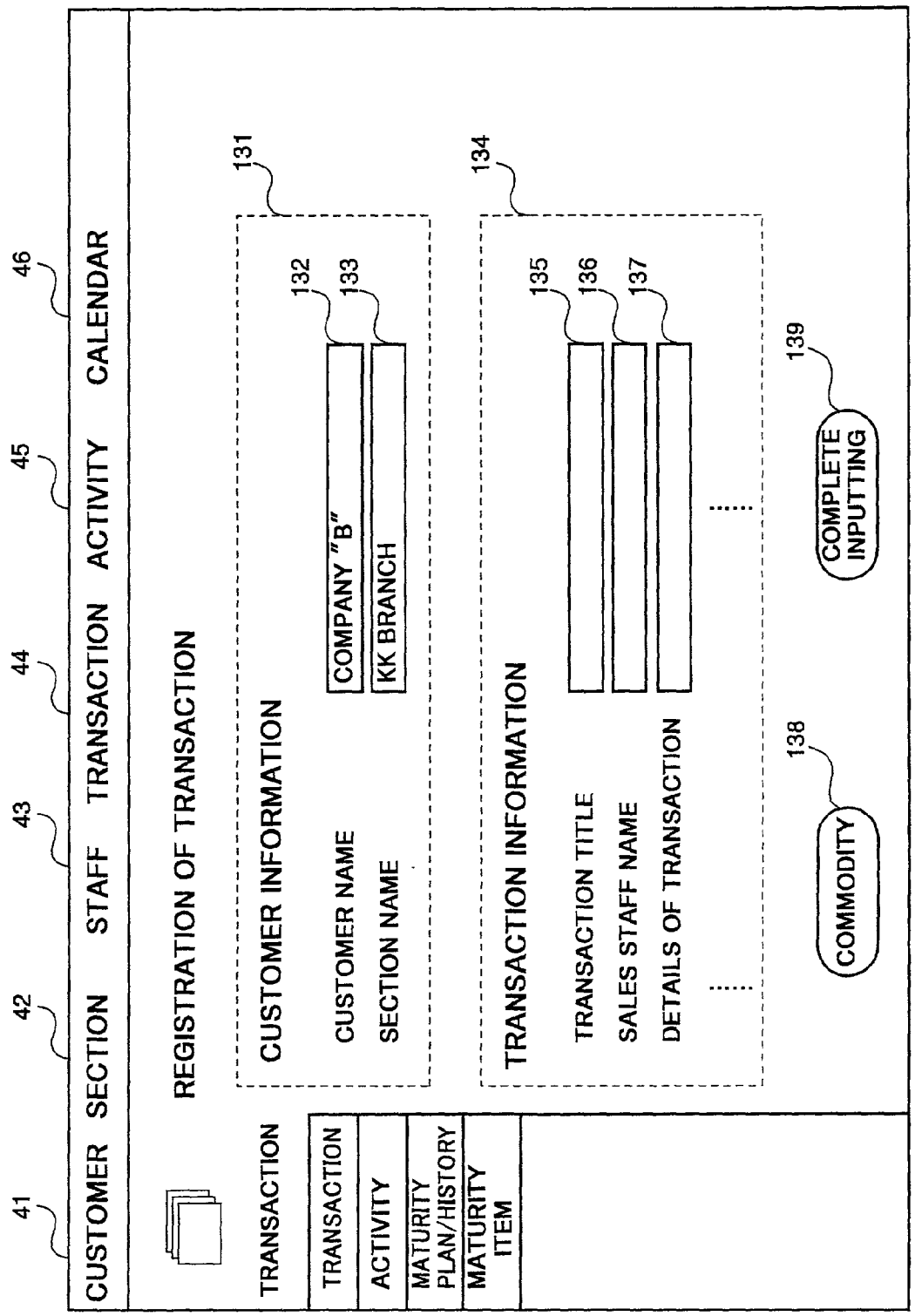
FIG. 13 is a diagram showing a transaction registration page to be displayed on the sales-staff terminal.

FIG. 13 is a diagram showing the transaction-registration page. As shown in FIG. 13, the transaction-registration page includes transaction customer information 131, transaction information 134 representing contents of a transaction to be registered, a "Commodity" button 138 and a "Completion" button 139. The transaction customer information 131 represents a customer of a transaction to be registered. The "Completion" button 138 is to indicate that the inputting is completed. The transaction customer information 131 is to specify a customer of the transaction to be registered.

When the operator clicks on the button 63 on the transaction list page (by customer) of FIG. 6, the SFA server 1 sets the sales-staff terminal 2-k to display a customer name and a section name of the specified customer respectively in the boxes 132 and 133. This is because the transaction list page (by customer) is to show a list page regarding the specified customer.

When the operator clicks on the button 82 on the transaction list page shown in FIG. 8 or the button 113 on the activity list page shown in FIG. 11, the SFA server 1 sets the sales-staff terminal 2-k to display the customer names or section names registered in the customer database 10 in the box 132 or 133, in the form of a pull-down menu. The operator of the sales-staff terminal 2-k pulls down the box 132 or 133 to specify a customer name or section name in relation to a target business transaction to be registered.

Further, the operator inputs information representing a transaction title, sales-staff name and details of the transaction, in relation to the transaction to be registered respectively in the boxes 135, 136 and 137, and clicks on the "Commodity" button 138. Upon this, the sales-staff terminal 2-k sends the specified or input information representing the customer name, section name, transaction title, sales-staff name, and details of the transaction and information representing that the "Commodity" button 138 has been clicked on, to the SFA server 1. Upon reception of the information sent from the sales-staff terminal 1, the SFA server 1 checks that the received customer name and section name are registered in the customer database 10. Further, the SFA server 1 creates transaction ID information for identifying the transaction. The SFA server 1 stores the generated transaction ID information, the received information representing the transaction title, the sales-staff name and details of the corresponding transaction in the a work area of the storage section 1B, in association with the received customer name and section name. At this time, the SFA server 1 sets a "non-maturity plan" flag included in the transaction information stored in the work area of the storage section 1B. The "non-maturity plan" flag indicates that there is no information of the maturity plan corresponding to the registered transaction information.

When the operator of the sales-staff terminal 2-k specifies that there is no need to create the maturity plan, the sales-staff terminal 2-k provides the SFA server 1 with "non-planned-transaction information" indicating that the operator has thus specified, together with the transaction information regarding the input transaction title. When storing thus provided transaction information together with the non-planned-transaction information in the work area of the storage section 1B, the SFA server 1 sets a "non planned" flag indicating that the maturity plan information corresponding to the stored transaction information is not necessary.

Figure 14:
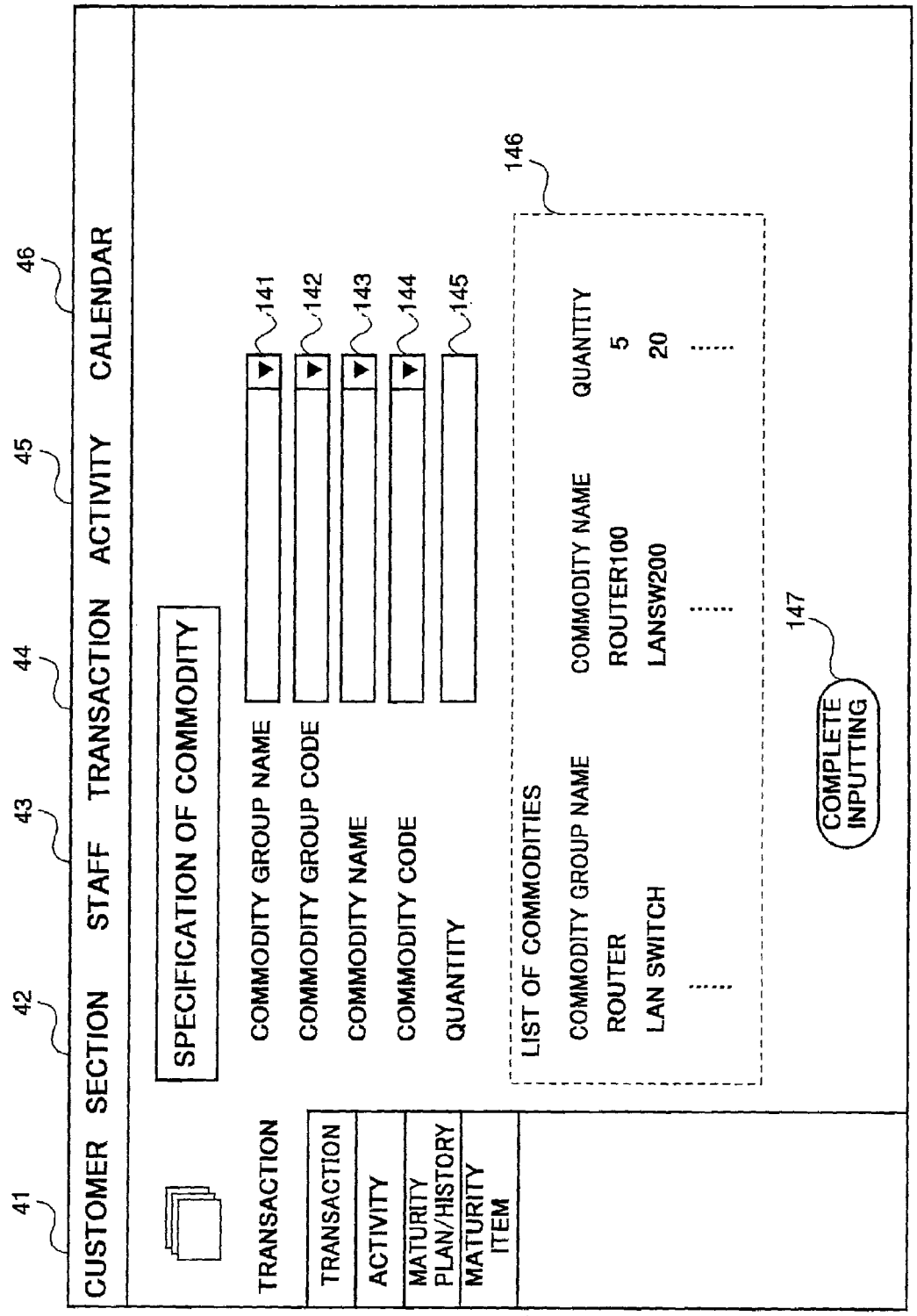
FIG. 14 is a diagram showing a commodity-specification page to be displayed on the sales-staff terminal.

After storing the transaction information in the work area of the storage section 1B, the SFA server 1 sets the sales-staff terminal 2-k to display the commodity specification page. FIG. 14 is a diagram showing the commodity specification page. As illustrated in FIG. 14, the commodity specification page includes five input boxes 141 to 145 for respectively specifying a commodity group name of a target commodity to be sold to the customer, a commodity group code, commodity name, commodity code and the number of commodity items to be sold. The commodity specification page includes also a list 146 of specified commodities and a "Completion" button 147 for specifying that the inputting is completed. The input boxes 141 to 145 for respectively the commodity group name, the commodity group code, the commodity name and commodity code are prepared in the form of a pull-down menu. If the operator clicks on a right triangle symbol of each input box, the SFA server 1 sets the sales-staff terminal 2-k to display a list of target commodities to be sold in the clicked input box in the form of a pull-down menu. Since information regarding the target commodities to be sold is registered in a commodity database 410, the SFA server 1 refers to the commodity database 410 and sets the sales-staff terminal 2-k to display the required information in the form of a pull-down menu. If the operator inputs either the commodity group name or the commodity group code, the SFA server 1 having received the input information from the sales-staff terminal 2-k sets the sales-staff terminal 2-k to display the corresponding information in the input box, based on the input information. For example, if the operator inputs a commodity group name, the SFA server 1 acquires the commodity group code of the specified commodity group name based on the information of the commodity database 410. Then, the operator sets the sales-staff terminal 2-k to display the acquired commodity group code in the input box 142. In the same manner, the commodity name and the commodity code can be displayed. In the case where the transaction is still at an early stage, a specific commodity to be sold might have not been determined yet. In this case, the operator may specify the commodity group only.

Upon completion of specifying the commodity group name, the commodity group code, the commodity name, the commodity code and the number of commodity items to be sold, the SFA server 1 sets the sales-staff terminal 2-k to display information regarding the specified commodity in the commodity list 146. If the operator clicks on the "Completion" button 147 after finishing specifying the entire commodity(s) to be sold in the transaction, the SFA server 1 stores the information regarding the specified commodities in the work area of the storage section 1B in association with the corresponding transaction. At the same time, the SFA server 1 sets the sales-staff terminal 2-k to again display the transaction registration page that had been displayed before the commodity specification page appears. If the operator clicks on the "Completion" button 139 on the transaction registration page, the SFA server 1 registers the transaction information stored in the work area of the storage section 1B, in the customer database 10.

If the operator clicks on the "Commodity" button 64 on the transaction list page (by customer) shown in FIG. 6, or the "Commodity" button 86 on the transaction list page shown in FIG. 8, the SFA server 1 sets the sales-staff terminal 2-k to display the commodity specification page shown in FIG. 14. In these cases, information regarding each of the specified commodities in the transaction is displayed in the commodity list 146 on the commodity specification page. If the operator clicks on a line corresponding to one of the commodities included in the commodity list 146, the SFA server 1 sets the sales-staff terminal 2-k to display information regarding the commodity of the clicked line in the input boxes 141 to 145. In accordance with the change made by the operator in the contents of the input box, the SFA server 1 updates the information stored in the work area of the storage section 1B. Upon clicking on the "Completion" button 147, the SAF server 1 sets the sales-staff terminal 2-k to display the previous page and registers the information stored in the work area of the storage section 1B in the customer database 10.

On the selection page shown in FIG. 4, in the case where the tab clicked by the operator of the sales-staff terminal 2-k corresponds to the item of "Calendar", the SFA server 1 sets the sales-staff terminal 2-k to display a page. This page shows, in the form of a calendar, information regarding activities included in the maturity plans of the entire transactions that the operator of the sales-staff terminal 2-k, i.e. the corresponding sales staff, is in charge of. This calendar may be a daily calendar, weekly calendar or monthly calendar.

FIG. 15 is a diagram showing a monthly calendar page. As shown in FIG. 15, various activity information sets in the calendar are underlined. This means that the information sets are in a hyperlink form so as to be linked to detail information regarding the activities. If the operator of the sales-staff terminal 2-k clicks on an arbitrary one of the activity information sets, the SFA server 1 sets the sales-staff terminal 2-k to display the detail information of a corresponding activity. A box 151 included in the calendar is prepared for specifying a sales staff name, and shows registered sales staff names in the form of a pull-down menu. Usually, an operator of the sales-staff terminal 2-k is permitted to specify only the sales staff name that has been input on the selection page shown in FIG. 4. If the operator pulls down the box 151 and specifies a staff name other than the input name, the sales-staff terminal 2-k sends the specified name to the SFA server 1. In this case, the SFA server 1 ignores the specified name, and continues to display the same calendar page on the sales-staff terminal 2-k.

On the monthly calendar page shown in FIG. 15, if the operator of the sales-staff terminal 2-k clicks on a view of "Activity" 152 on the left hand side of the page, the SFA server 1 sets the sales-staff terminal 2-k to display activity information of a corresponding month, in the form of the activity-list page shown in FIG. 11.

The sales-manager terminal 3 is operated by the manager of the sales section, for managing the activities of the sales staff. For example, the sales-manager terminal 3 may be a personal computer, etc. having substantially the same structure as that of the sales-staff terminals 2-1 to 2-n.

The sales-manager terminal 3 carries out substantially the same operations as those of the sales-staff terminals 2-1 to 2-n, by executing the WWW browser installed therein. However, the sales-manager terminal 3 may not have a function for inputting the above-described information (A) to (M), and refers to the information registered in the customer database 10. Hence, it is sufficient that the sales-manager terminal 3 displays a Web page in the HTML format sent from the SFA server 1, so that the operator of the sales-staff terminal 2-k checks the information contents displayed thereon and inputs information representing that the operator has checked the information.

If the operator of the sales-manager terminal 3, i.e. the sales manager, etc., operates the sales-terminal 3, the sales-manager terminal 3 and the SFA server 1 operate in the manner described below, in accordance with the operations of the operator.

The operator of the sales-manager terminal 3 is the sales manager who should usually be a boss of the sales staff. The sales manager operates the sales-manager terminal 3 so as to periodically check the sales activities done by his/her followers, and accesses the SFA server 1. Likewise the case of the sales-staff terminal 2-k, the sales manager operates the sales-manager terminal 3 in order to start the WWW browser, and accesses the SFA server 1. Then, the SFA server 1 sets the sales-manager terminal 3 to display the selection page shown in FIG. 4 thereon.

If the sales manager clicks on a tab of "Calendar" on the selection page of FIG. 4 to check the activities of the sales staff on the very day or recent days, the SFA server 1 sets the sales-manager terminal 3 to display the monthly calendar page shown in FIG. 15 or a daily or weekly calendar page. The SFA server 1 selects either one of a daily calendar, a weekly calendar or a monthly calendar, based on pre-set information or previous selection. If the sales manager specifies a target sales person to be checked, from the pull-down menu shown in the box 141 of the calendar page, the sales-manager terminal 3 sends the specified person's name to the SFA server 1. Upon reception of the information representing the specified sales person's name from the sales-manager terminal 3, the SFA server 1 retrieves activity information of the sales person from the customer database 10, and controls the sales-manager terminal 3 to display the retrieved activity information. The sales manager can refer to the activity information of an arbitrary sales person.

If the sales manager click on the activity information on the calendar page to check the detail information of the activity information, the SFA server 1 displays the detail information of the specified activity information on the sales-manager terminal 3. If the sales manager clicks on the view of "Activity" on the calendar page, the SFA server 1 sets the sales-manager terminal 3 to display a list of activities done by the specified sales person in the form of the activity list page shown in FIG. 11. The activity information is displayed in the form of a daily calendar, a weekly calendar or a monthly calendar, in accordance with the calendar page.

The sales manager may click on a particular transaction title of the corresponding activity information on the displayed page, to check the activities done or to be done by the sales staff in relation to a concerned transaction included in the activity information displayed on the activity list page. Upon this, the sales-manager terminal 3 sends the clicked transaction title to the SFA server 1, and the SFA server 1 sets the sales-manager terminal 3 to display a maturity plan/history page of the corresponding transaction. The sales manager check the work context of the corresponding transaction on the maturity plan/history page displayed on the sales-manager terminal 3, and clicks on a target maturity name of a maturity so that the sales manager can check the maturity stage thereof according to each maturity. Then, the SFA server 1 having received information representing the clicked maturity name from the manager terminal 3 displays a maturity item page of the specified maturity, on the sales-manager terminal 3.

The sales manager checks the attainment level of the maturity item by maturity and the progress of the entire business transactions, based on the information contents displayed on the maturity plan/history page and maturity item page, thereafter inputting information representing that the review of the corresponding maturity plan has been completed. Then, the sales-manager terminal 3 sends the review-completion information to the SFA server 1. Upon reception of the review completion information, the SFA server 1 resets a corresponding "non-reviewed maturity plan" flag in the customer database 10, so as to indicate that the information (G) representing the shown maturity plan has been reviewed.

If the sales manager clicks on the view "Scenario" 58 in the state where the customer information is selected on the customer list page shown in FIG. 5, the SFA server 1 sets the sales-manager terminal 3 to display information (representing a path name of a file described in a strategic scenario and the date the scenario is created) regarding the strategic scenario for the corresponding customer. If the sales manager completely reviewed the strategic scenario inputs information representing about the completion of the scenario, the sales-manager terminal 3 sends information representing that the strategic scenario has completely reviewed to the SFA server 1. Upon reception of this information from the manager terminal 1, the SFA server 1 sets an "scenario reviewed" flag in the customer database 10, so as to indicate that the sales manager has completed reviewing the information (M).

In the case where the SFA server 1 sets the sales-manager terminal 3 to display a list of customers, a check box is attached to each of the customer names included in the list. This check box is to show whether a "non-maturity plan" flag is set in association with a corresponding customer. If the sales manager clicks on the check box indicating that the "non-maturity plan" flag is set, the sales-manager terminal 3 sends information, to the SFA server 1, representing that it is necessary to make a maturity plan for the customer corresponding to the marked check box. Upon reception of the information from the sales-manager terminal 3, the SFA server 1 resets the "non-maturity plan" flag for the customer (s) corresponding to the marked check box.

Explanations will now be made to the SCM subsystem 400.

The SCM server 4 comprises a processor 4A, a storage section 4B and a timer 4C including a quartz oscillator, etc. The processor 4A includes a CPU, etc., and carries out later-described processes. The timer 4C continuously generates date/time information indicating the present date and time.

Figure 16:
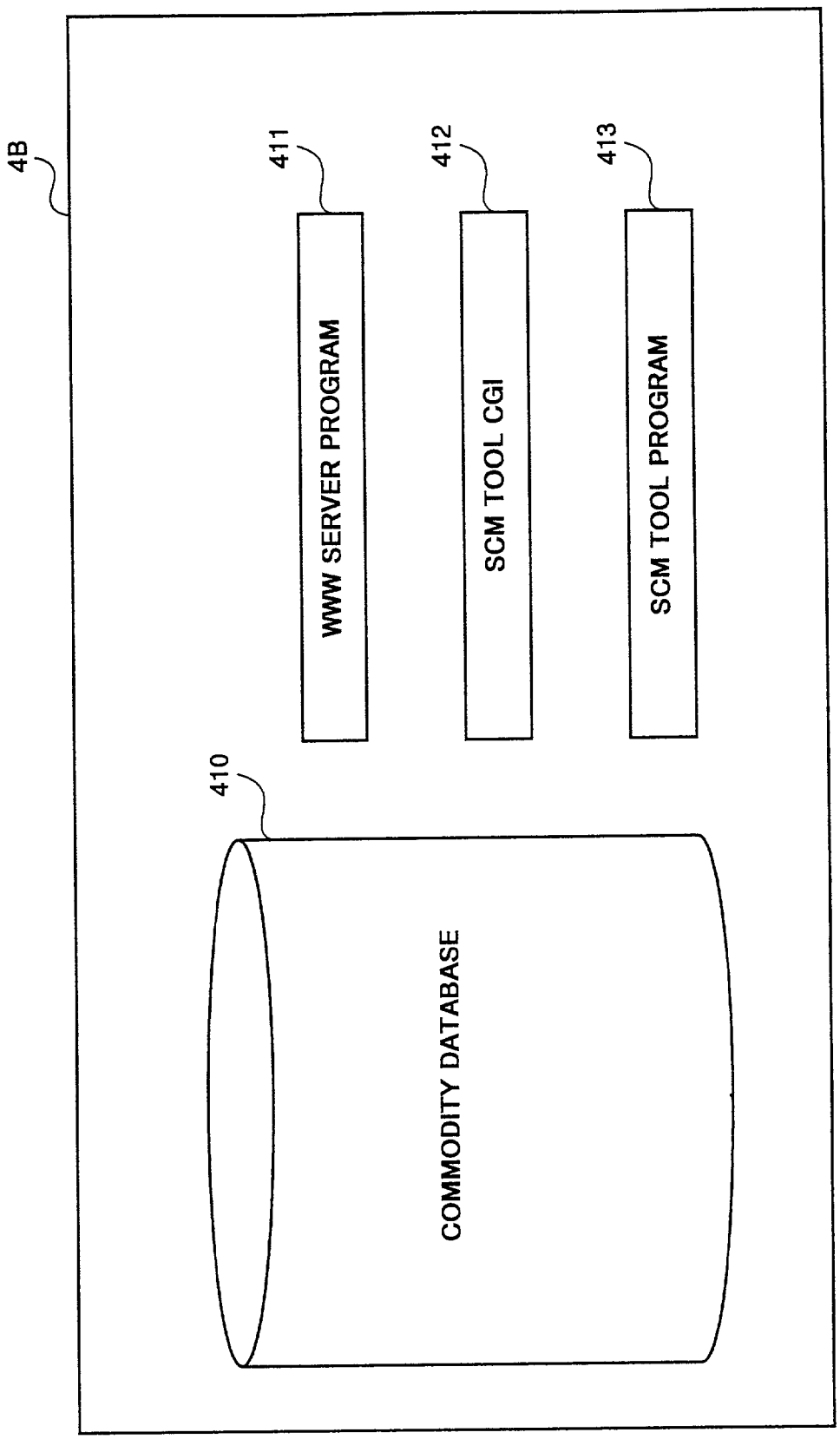
FIG. 16 is a diagram showing data and a program stored in a storage section of an SCM server shown in FIG. 1.

The storage section 4B is connected to the processor 4A, and includes a hard disk device or a RAM, etc., and stores the commodity database 410, a WWW server program 411, an SCM tool CGI 412 and an SCM tool program 413, as illustrated in FIG. 16.

The commodity database 410 is a collection of information regarding commodities managed by the SCM subsystem and information for supplying and manufacturing commodities. The commodity database 410 is stored in the storage section 4B, and updates in accordance with operations, as will be explained later.

The commodity database 410 includes the following information, for example.

Information Regarding Commodities

Information regarding commodity attributes, such as the commodity name, commodity code, commodity group name, commodity group code and size of commodity, etc.

Information Regarding Supply of the Commodity

Information regarding each supplier (manufacturer, wholesaler, manufacturing factory if manufactured by the enterprise itself) of commodities to be sold and information regarding the supplying capacity of the supplier. In case if commodity is manufactured by the enterprises, this information includes the following information regarding each supplier of components or materials to produce the commodity and information regarding the capacity of the supplier toward the supplying of commodities.

Information Regarding the Manufacturing of Commodities

Information regarding manufacturing processes, in the case where commodity to be sold is manufactured by the enterprise, and information regarding components and materials included in the commodity. Information regarding a list of components included in the commodity, and information regarding attributes, such as the component code of each component and the size of each component, and also information regarding the code of each material, the size of each material, etc.;

Information Regarding Sales of Commodities

Information regarding results of sales of each commodity;

Information Regarding the Ordering of Commodities

Information regarding the number of commodities to be ordered and the time for ordering the commodities;

Information Regarding the Stock

Information regarding the quantity of stocks of commodities to be sold, components of the commodities, and materials of the components, and information regarding the period of time they are being in stock; and Information Regarding the Demand for Each Kind of Commodities Information indicating the estimated and past demands of each kind of commodities.

The SCM server 4 searches and updates the commodity database 410, in response to a request from the SCM terminal 5. The SCM server 4 performs functions as an SCM server for supporting/managing the activities for manufacturing/supplying commodities for the requested SCM terminal 5. To achieve this, the WWW server program 411, the SCM tool CGI 412 and the SCM tool program 413 run on the SCM server 4.

The WWW server program 411 is a program for receiving a Web access request from the SCM terminal 5 and providing a result of processing done by the SCM server 5 in accordance 3 with the contents of the received access request to the SCM terminal 5. Specifically, if the SCM terminal 5 specifies a URL indicating the SCM tool CGI 412 and sends a Web access request to the SCM server 4, the WWW server program 411 receives this Web access request, starts the SCM tool CGI 412, and provides the SCM tool CGI 412 with data representing the operational contents of the accessed SCM terminal 5. The WWW server program 411 sends the result of processing sent back from the SCM tool CGI 412 to the SCM terminal 5.

The SCM tool CGI 412 is an interface program between the WWW server program 411 and the SCM tool program 413. Upon reception of the data representing the operational contents of the SCM terminal 5, the SCM tool CGI 412 transforms the received data into the interface form of the SCM tool program 413, and calls the SCM tool program 413 to provide the transformed data thereto. Then, the SCM tool CGI 412 receives the result of the processing done in accordance with the above data from the SCM tool program 413, transforms the received result in the Web page description form, such as an HTML format, etc., and provides the WWW server program 411 with the transformed data.

The SCM tool program 413 is a program executing functions as an SCM server. The SCM tool program 413 is called from the SCM tool CGI 412, and receives the data representing the operational contents of the accessed SCM terminal 5. Upon this, the SCM tool program 413 carries out various functions as SCM tools including operations of the commodity database 410, based on the received data, and sends back the result of processing to the SCM tool CGI 412.

The above-described operations of the SCM server 4 are the standard operations of the SCM server 4. In the following explanations, unless it is necessary, the WWW server program 411, the SCM tool CGI 412 and the SCM tool program 413 will not be described, and the operations of the SCM server 4 will be explained as a whole.

Main operator of the SCM terminal 5 is a person who is in charge of the supplying or manufacturing of commodities. The SCM terminal 5 is a personal computer, etc. which operates as a client terminal toward the SCM server 4. The SCM terminal 5 includes a display device 5A including a liquid crystal display, etc., and an input device 5B including a keyboard, a mouse, etc.

The WWW browser runs on the SCM terminal 5. The operator of the SCM terminal 5 operates the WWW browser to access the SCM server 4, requests for a desired function, and gets a service of the function.

In response to a request from the SCM terminal 5, the SCM server 4 estimates the demand for each kind of commodities, and provides the SCM terminal 5 with a result of the estimation. Furthermore, the SCM server 4 stores the estimated demand in the commodity database 410.

Specifically, the SCM server 4 estimates the demand for each kind of commodities, based on a status of a check flag included in the information (maturity plan) (G) registered in the customer database 10 of the SFA server 1.

In more particular, the processor 4A of the SCM server 4 accesses the customer database 10 stored in the storage section 1B through the SFA server 1, at predetermined intervals in accordance with a timer 4C. Every time the processor 4A accesses the customer database 10, it determines the highest maturity stage attained for each transaction, and totals the sales of commodities (i.e. the number of commodities to be sold) having the same commodity code or commodity group code in the transactions with the same highest maturity stage. The highest maturity stage (hereinafter may be referred to simply as the maturity stage of the transaction) attained can be determined by finding out the highest maturity stage of the maturity stages having maturity items all marked by check flags.

Then the processor 4A calculates change (an increase or decrease) rates of the total sales of commodities having the same commodity code or commodity group code in the transactions with the same highest maturity stage between the current total and the last total. The processor 4A estimates a demand for each commodity or commodity group, by calculates a value derived by assigning the calculated change rates and a total number of an actual demand for the commodity (commodity group) at the current time of the estimation. That is, the processor 4A calculates the estimated demand for each commodity based on the actual demand at the current time of the estimation, by adopting the predetermined function. The predetermined function weighs change rates by the maturity stage with weights each depending on a rate of transactions to be resulted in actual sales by each maturity stage.

In response to a request from the SCM terminal 5, the SCM server 4 determines the new supply into the market of each commodity, based on the estimated result of the demand for the commodity and the stock information stored in the commodity database 410. Then, the SCM server 4 sends the determination result to the SCM terminal 5. At this time, the SCM server 4 determines the supply, in consideration of the shift of the estimated demand in the future, the stock of the commodity, the estimated value of the future stock of the commodity and the appropriate stock of the commodity.

In response to a request from the SCM terminal 5, the SCM server 4 determines the supply of components or materials necessary for manufacturing the commodity of the amount determined based on the information stored in the commodity database 410, in the case where the enterprise manufactures the commodity. At this time, the SCM server 4 determines suppliers of the components or materials. Then, the SCM server 4 provides the SCM terminal 5 with the determination result. On the contrary, in the case where the enterprise does not manufacture the commodity, the SCM server 4 determines the suppliers of the commodity and the number of commodity to be supplied from each supplier, based on the information stored in the commodity database 410 and the determined supply. Then, the SCM server 4 sends the determination result to the SCM terminal 5.

The structure of the Enterprise Activity Management System is not limited to the above.

For example, one server computer may have the functions of the SFA server 1 and SCM server 4. The sales-staff terminal 2-k may have the function of the sales-manager terminal 3. Further, the SFA server or SCM server 4 may act as the sales-staff terminal 2-k, sales-manager terminal 3 or SCM terminal 5.

When calculating the estimated sales of the target, the SCM server 4 may calculate the number for each maturity stage by classifying the commodities with classifications each depending on the maturity stage. For example, the SCM server 4 estimates the total sales of commodities with the same commodity group code in the transactions at the highest maturity stage for "Understanding Needs of Customer". On the other hand the SCM server 4 estimates the total sales of commodities with the same commodity code in the transactions at the highest attained maturity stage for "Formal Proposal".

When estimating the sales of the commodity, the SCM server 4 may set the weight value with which the change rate of each maturity stage is weighted in accordance with a rate of transactions to be resulted in actual sales by the maturity stage, based on the information representing the results of the past business transactions according to each customer. Similarly, in the case where there is large difference among rates of transactions to be resulted in actual sales by the maturity stage among commodities or commodity groups, the SCM server 4 may set a weight value with which the change rate of each maturity stage is weighted in accordance with the rate of transactions to be resulted in actual sales of each commodity or commodity group, based on the information representing the results of the past business transactions.

When estimating the sales of the commodity, the SCM server 4 may estimate the future demand for each commodity, based on the statistical data representing a period of time required for successfully completing the business transaction, according to each maturity stage. For example, the SCM server 4 calculates the probability that the transaction of the maturity stage will successfully be achieved within a predetermined period, based on distribution data of the days required for completing the business transaction, according to each maturity stage of commodities concerned. Subsequently, the SCM server 4 multiplies the estimated sales of the commodity at the current time of the estimation for each maturity stage by the calculated probability. Then the SCM server 4 totals the resultant values of the multiplication at the entire maturity stages, and sets the total as the estimated demand within the predetermined period. In the case where there is a wide range of estimated days required for successfully achieving each business transaction in accordance with a scale of the estimated sales of commodities, the business transactions are classified into groups based on the scale of the estimated sales of commodities. Then, the SCM server 4 may estimate the demand for the corresponding commodity within a predetermined period, based on the probability that each group of transactions will successfully be completed within the period.

The sales-staff terminal 2-k or sales-manager terminal 3 may access the SCM server 4 through a network (and/or the SFA server 1), in response to an operation of the operator, and acquire the estimated result of the demand for commodities and the determination result of the number of commodities to be ordered, so as to display the acquired information on its display screen.

The embodiment of the present invention has been explained above. The Enterprise Activity Management System according to this invention can be realized using a general computer system without a dedicated system therefor.

For example, a program for executing the operations of the above SFA server 1, sales-staff terminals 2-1 to 2-n, sales-manager terminal 3, SCM server 4 and SCM terminal 5 may be stored on a medium (a CD-ROM, a magnetic tape, etc.). The program is installed in a plurality of computers each including a DSU or a terminal adapter and being connected with each other through a network, thereby realizing the Enterprise Activity Management System that carries out the above-described processes.

Additionally, a program for executing operations of the SFA server 1, sales-staff terminals 2-1 to 2-n, sales-manager terminal 3, SCM server 4 and the SCM terminal 5 may be recorded on a medium. The program may be installed in a stand-alone computer, thereby realizing the Enterprise Activity Management System that carries out the above-described processes.

For example, the program may be posted on a BBS (Bulletin Board System) on a communications circuit and transmitted through the circuit. A carrier wave(s) may be modulated using a data signal representing the program, and a resultant modulated wave may be transmitted to an apparatus. Then, this apparatus may restore the program by demodulating the received wave.

This apparatus activates the program, and executes any other application programs, so as to carry out the above processes, under the control of the OS (Operating System).

In the case where a part of the processes is done by the OS, or where the OS may be a part of the elemental components of the present invention, a program excluding that part may be stored on a recording medium. In such a case as well, according to this invention, a program for executing each of the functions of steps executed by the computer is stored on the recording medium.

The customer database 10 may be installed separately from the SFA server 1, and the SFA server may access the customer database 10 through a network. For example, the software of the SFA server 1 is provided by an ASP (an Application Service Provider, etc.), and the customer database 10 may be installed in a computer system of a corporation managing the sales activities at the corporation using the SFA server 1. Otherwise, the software of the SFA server provided by the ASP may be combined with the customer database 19 installed in a data center.

Similarly, the commodity database 410 may be installed separately from the SCM server 4, and the SCM server 4 may access the commodity database 410 through a network. For example, the software of the SCM server 4 is provided by the ASP, and the commodity database 410 may be installed into a computer of an enterprise utilizing the SCM server 1. The software of the SCM server 4 may be combined with the commodity database 410 installed into the data center.

Further, instead of managing the plans and schedules of the sales activities in association with the nine stages of the maturity stages, the SFA server 1 may manage the plans and schedules in association with the number of stages in a manner corresponding to the contents of the industry field to be managed. When building the sales management system of the present invention, the number of maturity stages and contents of each maturity stage may be defined in the SFA server 1.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-344819 filed on Nov. 13, 2000, and including specification, claims, drawings and summary. The disclosure of the above Japanese Patent Application is incorporated herein by reference in its entirety.

What is claimed is:

1. A commodity-supply planning method comprising:
storing transaction information representing contents of each of a plurality of transactions in a storage, in association with each of the plurality of transactions each for providing commodities to customers, and storing progress information representing whether each of the plurality of transactions is in a state of attaining each of a plurality of stages each indicating a progress level of the transaction based on progress of sales activities performed for accomplishing the transaction, in association with the transaction information, in said storage;
summing a number of transactions dealing with a same commodity and having reached a same stage, twice at different points in time; and
calculating an increase or decrease rate of the number of transactions, which have reached their respective stages, from results of the twice summing performed twice continuously;
calculating an accomplishment probability by each stage of the plurality of the stages, the accomplishment probability being a probability that each of the transactions in a state of attaining the stage as the highest attained stage will be successfully accomplished after a predetermined period of time, based on statistical data representing a period of time required for successfully accomplishing each of the transactions in a state of attaining the stage as the highest attained stage;
multiplying, by each stage, a sum of the expected sales of the commodities by the accomplishment probability;
setting a sum of the products calculated in the multiplying step for the plurality of the stages;
estimating a future demand for the commodities based on the previous steps; and
storing the estimated future demand on a computer readable storage medium.

2. The commodity-supply planning method according to claim 1, wherein
the stored transaction information includes information representing expected sales of the commodities in each of the plurality of transactions.

3. The commodity-supply planning method according to claim 1, further including:
calculating a change rate in the expected sales of the commodities based on the expected sales of the commodities, at each of the plurality of the stages, and estimating the future demand for the commodities, based on the actual demand and the calculated change rates at the plurality of the stages.

4. The commodity-supply planning method according to claim 1, further including:
making a plan for supplying the commodities, based on the expected demand and stock of the commodities.

5. A commodity-supply planning method comprising:
reading transaction information stored in a first storage and progress information stored in the storage associated with the transaction information;
summing a number of transactions dealing with a same commodity and having reached a same stage, the stage corresponding to the progress information, twice at different points in time, and storing the number of transactions summed in a second storage;
reading results of the summing performed twice continuously, from the second storage; and
calculating an increase or decrease rate of the number of transactions, which have reached their respective stages, from reading the results of the summing,
wherein the transaction information represents contents of each of a plurality of transactions for supplying customers with the commodities, and wherein
the progress information represents whether each of the plurality of transactions is in a state of attaining each of a plurality of stages each indicating a progress level of the transaction, based on progress of sales activities performed for accomplishing the transaction;
calculating an accomplishment probability by each stage of the plurality of the stages, wherein the accomplishment probability is a probability that each of the transactions in a state of attaining the stage as the highest attained stage will be successfully accomplished after a predetermined period of time, based on statistical data representing a period of time required for successfully accomplishing each of the transactions in a state of the stage as the highest attained stage;
multiplying a sum of the expected sales of the commodities by the accomplishment probability, by each stage;
setting a sum of the products of multiplying by the accomplishment probability for the plurality of the stages;
estimating a future demand for the commodities based on the previous steps; and
storing the estimated future demand on a computer readable storage medium.

6. The commodity-supply planning method according to claim 5, wherein
the transaction information includes information representing expected sales of the commodities in the transaction specified in the transaction information.

7. The commodity-supply planning method according to claim 5, further including:
calculating a change rate in the sums of the expected sales of the commodities, based on the sums of the expected sales of the commodities at the plurality of points in time, by each stage, and estimating a future demand for the commodities based on an actual demand for the commodities and the calculated change rates.

8. The commodity-supply planning method according to claim 5, further including:
classifying, by each stage, the plurality of transactions in a state of attaining the stage as the highest attained stage, based on a scale of the sales of the commodities in each of the transactions; and
calculating the accomplishment probability by each group of transactions.

9. The commodity-supply planning method according to claim 5, further including:

multiplying, by each stage, the product calculated in the multiplying step by a weighting coefficient in accordance with a kind of the commodities; and setting a sum of the resultant products of multiplying by the weighting coefficient for the plurality of the stages, as an expected demand for the commodities within the predetermined period of time.

10. The commodity-supply planning method according to claim 5, further including:

making a plan for supplying the commodities, based on the estimated demand and stock of the commodities.

11. A commodity-supply planning system comprising:
a first server including
a first processor which manages information regarding supplying of commodities,
a first storage which stores information regarding the supplying of the commodities, and
a timer which provides said first processor with date/time information; and a second server including
a second processor which manages information regarding sales activities of the commodities, and
a second storage which stores information regarding the sales activities, wherein said second processor
stores transaction information in said second storage, wherein the transaction information represents contents of each of a plurality of transactions each for providing customers with the commodities, and
stores progress information in said second storage associated with the transaction information, wherein the progress information represents whether each of the plurality of the transactions is in a state of attaining each of a plurality of stages, each stage indicating a progress level of each of the plurality of transactions, based on progress of the sales activities performed for accomplishing each of the transactions, and wherein said first processor
reads the transaction information and the progress information which are stored in said second storage unit, in association with each other,
sums a number of transactions dealing with a same commodity and having reached a same stage, twice at different points in time, according to the date/time information sent from said timer, and stores the number of transactions summed in said first storage;
reads results of the summing performed twice continuously, from said first storage; and
calculates an increase or decrease rate of the number of transactions, which have reached their respective stages, from the read results of the summing;
calculates an accomplishment probability by each stage of the plurality of the stages, wherein the accomplishment probability is a probability that each of the transactions in a state of attaining the stage as the highest attained stage will be successfully accomplished after a predetermined period of time, based on statistical data representing a period of time required for accomplishing each of the transactions in a state of attaining the stage as the highest attained stage;
multiplies a sum of the expected sales of the commodities by the accomplishment probability, by each stage;
sets a sum of the products of multiplying by the accomplishment probability for the plurality of the stages;
estimates a future demand for the commodities based on the previous steps; and
stores the estimated future demand on a computer readable storage medium.

12. The commodity-supply planning system according to claim 11, wherein
the transaction information including expected sales of the commodities in each of the plurality of transactions, in said second storage.

13. The commodity-supply planning system according to claim 11, wherein
said first processor calculates a change rate in the sums of the expected sales of the commodities based on the sums of the expected sales of the commodities, by each stage, and estimates a future demand for the commodities, based on the actual demand and the calculated change rates.

14. The commodity-supply planning system according to claim 11, wherein said first server and said second server are included in the same computer.

15. A commodity-supply planning system comprising:
a processor which manages information regarding supplying of commodities;
a first storage which stores information regarding the supplying of the commodities; and
a timer which provides said processor with date/time information,
wherein said processor
reads out transaction information and progress information which are stored in a second storage in association with each other,
sums a number of transactions dealing with a same commodity and having reached a same stage, twice at different points in time, according to the date/time information sent from said timer, and stores the number of transactions summed in said first storage;
reads results of the summing performed twice continuously, from said first storage; and
calculates an increase or decrease rate of the number of transactions, which have reached their respective stages, from the read results of the summing,
wherein the transaction information represents contents of each of the plurality of transactions for providing customers with the commodities, and
wherein the progress information represents whether each of the transactions has reached each of a plurality of stages indicating a progress degree of the transaction, in accordance with progress of sales activities performed for successfully accomplishing each transaction specified in the transaction information;
calculates an accomplishment probability by each of the plurality of the stages, wherein the accomplishment probability is a probability that each of the transactions in a state of attaining the stage as the highest attained stage will be successfully accomplished after a predetermined period of time, based on statistical data representing a period of time required for successfully accomplishing each of the transactions in a state of attaining the stage as highest attained stage;
multiplies a sum of the expected sales of the commodities by the accomplishment probability, by each stage;
sets a sum of the products of multiplying by the accomplishment probability for the plurality of the stages a value;
estimates a future demand for the commodities based on the previous steps; and
stores the estimated future demand on a computer readable storage medium.

16. The commodity-supply planning system according to claim 15, wherein the transaction information includes expected sales of the commodities in each of the transactions specified in the transaction information.

17. The commodity-supply planning system according to claim 15, wherein said processor
calculates a change rate in the sums of the expected sales of the commodities, based on the sums of the expected sales of the commodities at the plurality of points in time, by each stage, and estimates a future demand for the commodities based on an actual demand for the commodities and the calculated change rates for the plurality of the stages.

18. The commodity-supply planning system according to claim 15, wherein said processor:
classifies, by each stage, the plurality of transactions in a state of attaining the stage as the highest attained stage, based on a scale of the sales of the commodities in each of the transactions; and
calculates the accomplishment probability by each group of transactions.

19. The commodity-supply planning system according to claim 15, wherein said processor:
multiplies, by each stage, the resultant product of multiplying by a weighting coefficient in accordance with a kind of the commodities; and
sets a sum of the resultant products of multiplying by the weighting coefficient for the plurality of the stages, as an expected demand for the commodities within the predetermined period of time.

20. The commodity-supply planning system according to claim 15, wherein said processor
makes a plan for supplying the commodities, based on the estimated demand and stock of the commodities.

21. A computer-readable recording medium storing a program for controlling a computer to execute a commodity-supply planning method comprising:
storing transaction information representing contents of each of a plurality of transactions for providing customers with commodities and including sales of the commodities in each of the plurality of transactions, in a storage, and storing progress information representing whether each of the plurality of transactions is in a state of attaining each of a plurality of stages, in the storage in association with the transaction information, each stage indicating a progress level of the transaction based on progress of sales activities performed for accomplishing the transaction;
summing a number of transactions dealing with a same commodity and having reached a same stage, twice at different points in time; and
calculating an increase or decrease rate of the number of transactions, which have reaching their respective stages, from results of the summing performed twice continuously;
calculating an accomplishment probability by each stage of the plurality of the stages, the accomplishment probability being a probability that each of the transactions in a state of attaining the stage as the highest attained stage will be successfully accomplished after a predetermined period of time, based on statistical data representing a period of time required for successfully accomplishing each of the transactions in a state of attaining the stage as the highest attained stage;
multiplying, by each stage, a sum of the expected sales of the commodities by the accomplishment probability;
setting a sum of the products calculated in the multiplying step for the plurality of the stages;
estimating a future demand for the commodities based on the previous steps; and
storing the estimated future demand on a computer readable storage medium.

22. The recording medium according to claim 21, wherein the transaction information includes information representing expected sales of the commodities in each of the transactions.

* * * * *